(12) United States Patent
Nakamoto

(10) Patent No.: US 8,705,082 B2
(45) Date of Patent: Apr. 22, 2014

(54) IMAGE FORMING APPARATUS MONITORING SYSTEM AND METHOD THEREFOR

(75) Inventor: Hisashi Nakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1529 days.

(21) Appl. No.: 12/334,315

(22) Filed: Dec. 12, 2008

(65) Prior Publication Data

US 2009/0161143 A1 Jun. 25, 2009

(30) Foreign Application Priority Data

Dec. 13, 2007 (JP) ................................. 2007-322084

(51) Int. Cl.
*G06F 15/00* (2006.01)

(52) U.S. Cl.
USPC ....... 358/1.15; 358/1.14; 358/1.13; 358/1.18; 358/1.12; 709/220; 709/221; 709/201; 709/203; 717/168

(58) Field of Classification Search
None
See application file for complete search history.

(56) References Cited

U.S. PATENT DOCUMENTS

| | | | |
|---|---|---|---|
| 6,611,740 B2* | 8/2003 | Lowrey et al. | 701/29.4 |
| 7,146,412 B2* | 12/2006 | Turnbull | 709/220 |
| 7,203,723 B2* | 4/2007 | Ogawa | 709/203 |
| 7,213,052 B2* | 5/2007 | Mae et al. | 709/206 |
| 7,516,450 B2* | 4/2009 | Ogura | 717/168 |
| 7,595,902 B2* | 9/2009 | Yamaguchi et al. | 358/1.15 |
| 7,814,480 B2* | 10/2010 | Sakuda et al. | 717/173 |
| 2007/0291306 A1* | 12/2007 | Fujino | 358/1.15 |

FOREIGN PATENT DOCUMENTS

| | | |
|---|---|---|
| JP | 2000-020344 A | 1/2000 |
| JP | 2001-067225 A | 3/2001 |
| JP | 2001-282544 A | 10/2001 |
| JP | 2004-165734 A | 6/2004 |
| JP | 2005-004660 A | 1/2005 |
| JP | 2006-338543 A | 12/2006 |
| JP | 2007-034913 A | 2/2007 |

* cited by examiner

*Primary Examiner* — Ashish K Thomas
(74) *Attorney, Agent, or Firm* — Canon USA Inc. IP Division

(57) ABSTRACT

A monitoring server that monitors an image forming apparatus and detects an error if any has occurred thereon, identifies a type of firmware that has caused the error, and issues an instruction for replacing a version of the identified type of firmware. The image forming apparatus issues, to a transmission server, a request for transmitting a replacement version of the identified type of firmware. The transmission server refers to a firmware version list table to determine another type of firmware whose version is to be replaced in association with the replacement version of the identified type of firmware. The transmission server transmits the replacement version of the identified type of firmware and the determined another type of firmware to the image forming apparatus. The image forming apparatus receives each firmware transmitted from the transmission server and applies the received firmware to the image forming apparatus.

8 Claims, 20 Drawing Sheets

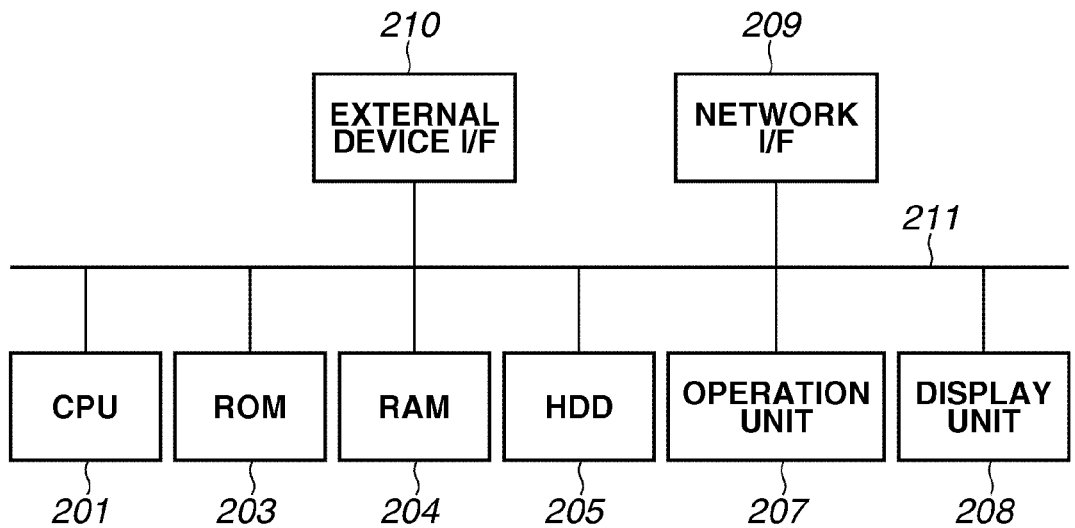
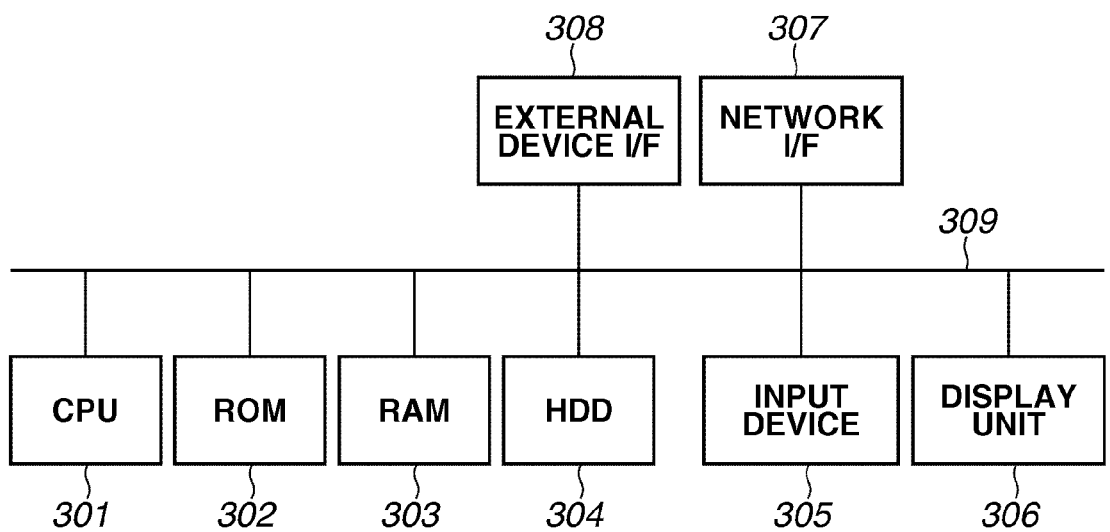

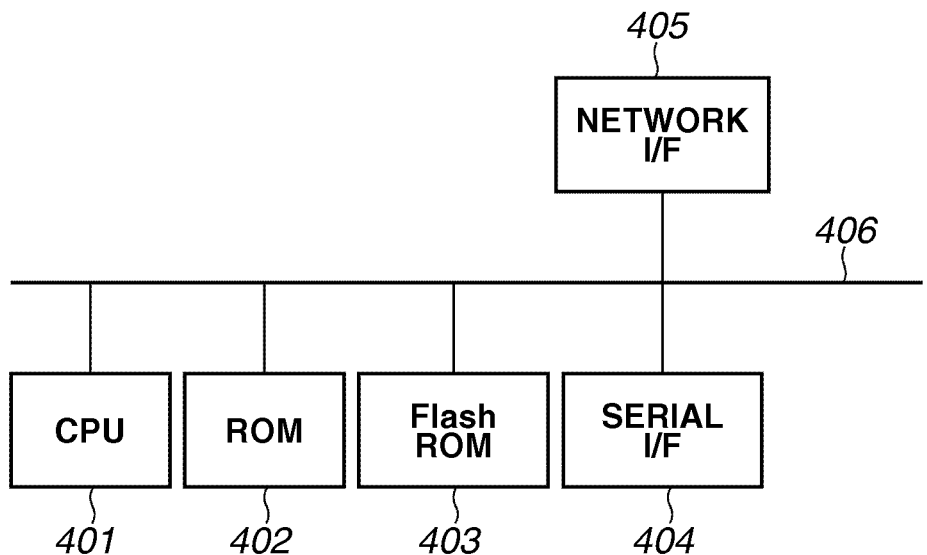
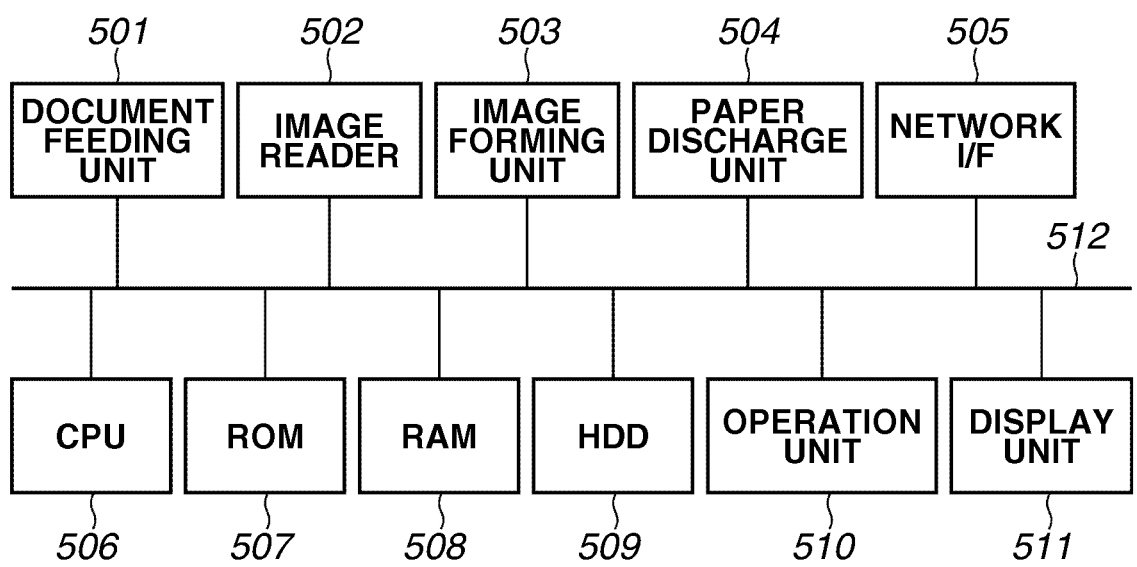

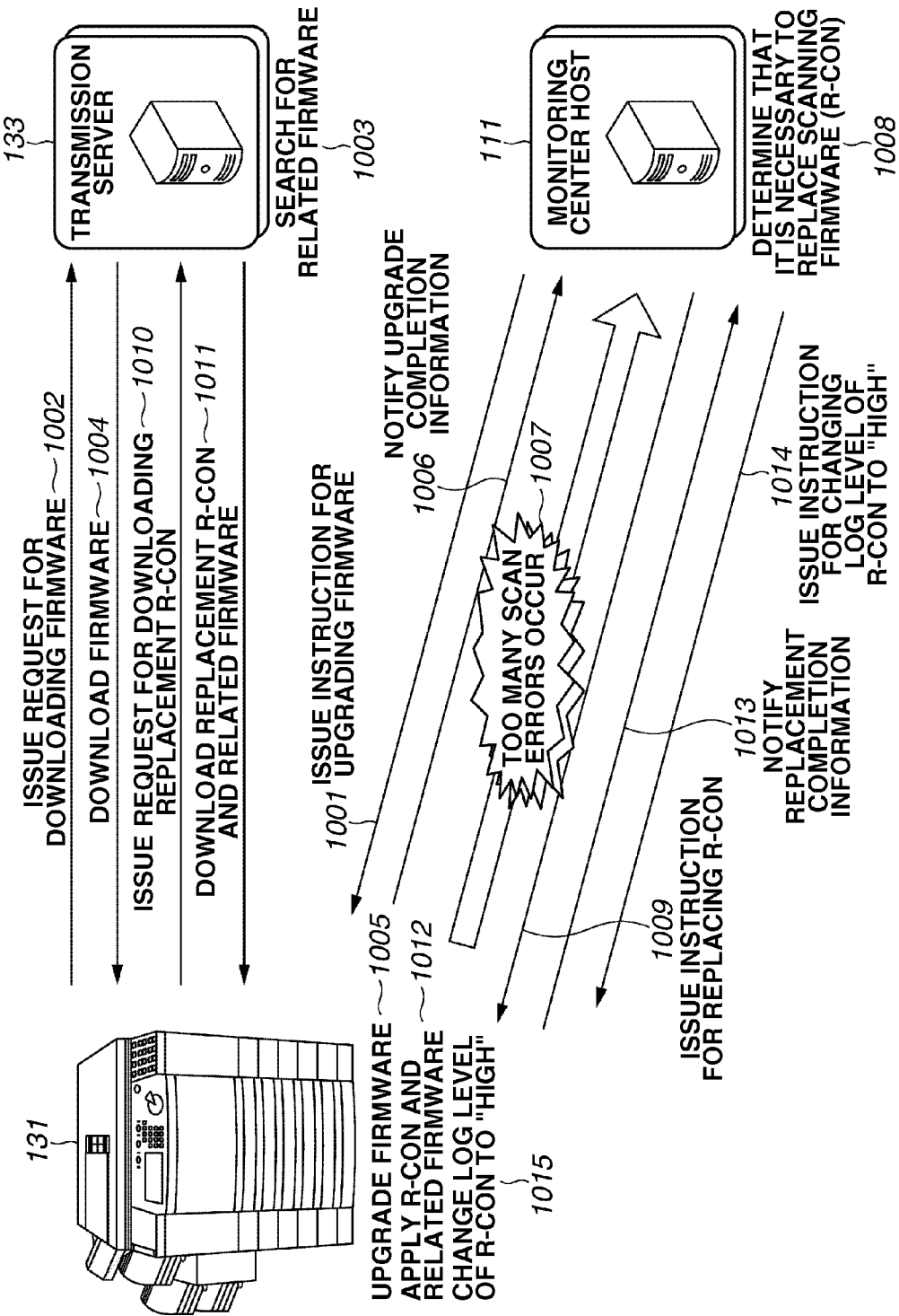

FIG.11

1101 ~ [FIRMWARE VERSION LIST TABLE]

| Version | PRODUCT NAME | MN-CONT | R-CON | D-CON | BOOTROM | PUNCH | SDL-STCH | MEAP | ... |
|---|---|---|---|---|---|---|---|---|---|
| 1.0 | iR XXXX | 14.00 | 5.00 | 13.00 | 6.00 | 1.40 | 1.00 | 10.00 | ... |
| 1.1 | iR XXXX | 15.00 | 6.00 | 14.00 | 7.00 | 1.50 | 1.00 | 10.00 | ... |
| 1.2 | iR XXXX | 16.00 | 7.00 | 15.00 | 8.00 | 1.90 | 1.00 | 18.00 | ... |
| 1.3 | iR XXXX | 17.00 | 8.00 | 15.00 | 9.00 | 1.90 | 1.00 | 18.00 | ... |
| 2.0 | iR XXXX | 18.00 | 8.00 | 15.00 | 10.00 | 2.00 | 1.00 | 18.00 | ... |
| 2.1 | iR XXXX | 19.00(2) | 9.00(4) | 19.00(3) | 11.00(1) | 2.00(5) | 1.00(6) | 19.00(7) | ... |
| 2.2 | iR XXXX | 20.00 | 10.00 | 19.00 | 12.00 | 2.00 | 1.00 | 19.00 | ... |

1102 — UPGRADE
1103
1104
1105
1106 — REPLACE
1107 — ERROR
1108 — MUTUALLY DIFFERENT
1109
1110 — MUTUALLY DIFFERENT

VERSIONS (1), (2), AND (4) ARE TO BE REPLACED. VERSIONS (3), (5), (6), AND (7) ARE TO BE ENABLED. *WITH RESPECT TO UPGRADING, VERSIONS (1) THROUGH (7) ARE PROCESSED AFTER ALL FIRMWARE IS DISABLED IN ADVANCE.

1111 ~ [FIRMWARE APPLICATION ORDER TABLE]

| PRODUCT NAME | FIRMWARE TYPE | APPLICATION ORDER |
|---|---|---|
| iR XXXX | MN-CONT | 2 |
| iR XXXX | R-CON | 4 |
| iR XXXX | D-CON | 3 |
| iR XXXX | BOOTROM | 1 |
| iR XXXX | PUNCH | 5 |
| iR XXXX | SDL-STCH | 6 |
| iR XXXX | MEAP | 7 |
| : | : | : |

1112 — FIRMWARE APPLICATION ORDER

GENERATE FILE

1113 ~ [FIRMWARE INFORMATION FILE]

```
Version: 2.2
PRODUCT NAME: iRXXXX
FIRMWARE    APPLICATION    USED IN
TYPE        ORDER          COMBINATION WITH...
BOOTROM     ,1             ,12.00,
MN-CONT     ,2             ,20.00,
D-CON       ,3             ,19.00,
R-CON       ,4             ,10.00,
PUNCH       ,5             ,2.00,
SDL-STCH    ,6             ,1.00,
MEAP        ,7             ,19.00,
:           :              :
```

FIG.12

| FIRMWARE TYPE (1201) | CORRESPONDING ERROR (1202) | FREQUENCY OF OCCURRENCE (THRESHOLD VALUE) (1203) |
|---|---|---|
| MN-CONT | ERROR IN COMMUNICATION BETWEEN CONTROL UNIT AND OPERATION UNIT, COMMUNICATION ERROR IN PDL BOARD... | 5 TIMES/DAY |
| R-CON | READER COMMUNICATION ERROR, ERROR IN COMMUNICATION WITH FINISHER, JAMMING AND CONGESTION AT READING SENSOR... | 10 TIMES/DAY |
| D-CON | ERROR IN COMMUNICATION BETWEEN CONTROL UNIT AND Dcon, RETRY ALARM BEEPING AT CASSETTE 1... | 10 TIMES/DAY |
| BOOTROM | DRAM CHECK ERROR ON BOOT ROM... | 3 TIMES/DAY |
| PUNCH | PUNCHING MOTOR ERROR, PUNCHING MOVING MOTOR ERROR, PUNCHING WASTES FULL... | 10 TIMES/DAY |
| SDL-STCH | SADDLE FOLDING MOTOR ERROR, JAMMING AT SADDLE STAPLER STITCH... | 10 TIMES/DAY |
| MEAP | MEAP ACTIVATION ERROR... | 3 TIMES/DAY |
| ⋮ | ⋮ | ⋮ |

| PRODUCT ID *1301* | PRODUCT NAME *1302* | FIRMWARE TYPE *1303* | LOG LEVEL *1304* |
|---|---|---|---|
| 0000XXXX001 | iR XXXX | MN-CONT | LOW |
| 0000XXXX001 | iR XXXX | R-CON | HIGH |
| 0000XXXX001 | iRC XXXX | D-CON | LOW |
| 0000XXXX001 | iRC XXXX | BOOTROM | LOW |
| 0000XXXX001 | iRC XXXX | PUNCH | LOW |
| 0000XXXX001 | iRC XXXX | SDL-STCH | LOW |
| 0000XXXX001 | iRC XXXX | MEAP | LOW |
| ⋮ | ⋮ | ⋮ | ⋮ |

FIG.14

| Version 1401 | PRODUCT NAME 1402 | MN-CONT 1403 | R-CON 1404 | D-CON 1405 | BOOTROM 1406 | PUNCH 1407 | SDL-STCH 1408 | MEAP 1409 | ⋯ |
|---|---|---|---|---|---|---|---|---|---|
| 1.0 | iR XXXX | 14.00 | 5.00 | 13.00 | 6.00 | 1.40 | 1.00 | 10.00 | ⋯ |
| 1.1 | iR XXXX | 15.00 | 6.00 | 14.00 | 7.00 | 1.50 | 1.00 | 10.00 | ⋯ |
| 1.2 | iR XXXX | 16.00 | 7.00 | 15.00 | 8.00 | 1.90 | 1.00 | 18.00 | ⋯ |
| 1.3 | iR XXXX | 17.00 | 8.00 | 15.00 | 9.00 | 1.90 | 1.00 | 18.00 | ⋯ |
| 2.0 | iR XXXX | 18.00 | 8.00 | 19.00 | 10.00 | 2.00 | 1.00 | 18.00 | ⋯ |
| 2.1 | iR XXXX | 19.00 | 9.00 | 19.00 | 11.00 | 2.00 | 1.00 | 19.00 | ⋯ |
| 2.2 | iR XXXX | 20.00 | 10.00 | 19.00 | 12.00 | 2.00 | 1.00 | 19.00 | ⋯ |

FIG.15

| Version | PRODUCT NAME | FIRMWARE TYPE | APPLICATION ORDER |
|---|---|---|---|
| 2.1 | iR XXXX | MN-CONT | 2 |
| 2.1 | iR XXXX | R-CON | 4 |
| 2.1 | iR XXXX | D-CON | 3 |
| 2.1 | iR XXXX | BOOTROM | 1 |
| 2.1 | iR XXXX | PUNCH | 5 |
| 2.1 | iR XXXX | SDL-STCH | 6 |
| 2.1 | iR XXXX | MEAP | 7 |
| ⋮ | ⋮ | ⋮ | ⋮ |

| | | 1604 | 1605 |
|---|---|---|---|
| 1601 | Version: 2.2 | | |
| 1602 | PRODUCT NAME: iRXXXX | | |
| 1603 | FIRMWARE TYPE | APPLICATION ORDER | USED IN COMBINATION WITH... |
| | BOOTROM | ,1 | ,12.00, |
| | MN-CONT | ,2 | ,20.00, |
| | D-CON | ,3 | ,19.00, |
| | R-CON | ,4 | ,10.00, |
| | PUNCH | ,5 | ,2.00, |
| | SDL-STCH | ,6 | ,1.00, |
| | MEAP | ,7 | ,19.00, |
| | ⋮ | ,⋮ | ,⋮, |

FIG.21

| FILE(F) | EDIT(E) | VIEW(V) | FAVORITES(A) | TOOL(T) | HELP(H) |
|---|---|---|---|---|---|

| HOME | OPERATION MANUAL | LOG |

| CUSTOMER INFORMATION | COMMUNICATION HISTORY | ANALYZE | REPORT | MANAGE CONSUMABLES | MANAGE SYSTEM | MANAGE MASTER INFORMATION |

COMMUNICATION HISTORY
- CALL TODAY
- ANALYZE CALL
- MANAGE SCHEDULE
  - NOTIFICATION INFORMATION
  - NOTIFICATION LOG
- TRANSMIT FIRMWARE

TRANSMIT FIRMWARE

| NAME OF SALES TARGET CUSTOMER | XX SALES CORPORATION ▼ | | | |
|---|---|---|---|---|
| CUSTOMER NAME | ALL ▼ | | CUSTOMER NAME | ALL ▼ |
| PDS ID | - PLEASE SELECT - ▼ | | DEVICE ID | ALL ▼ |

☑ VIP  ☑ ORDINARY CUSTOMER — 2101

NUMBER OF RESULTS TO BE DISPLAYED | 20 | | SEARCH | RESET | STORE CONDITION |

| FIRMWARE UPGRADE DATE AND TIME | CUSTOMER NAME | CUSTOMER ID | CONTRACT TYPE | PDS ID | DEVICE ID | DEVICE NAME | FIRMWARE VERSION | LATEST VERSION? | DETAIL |
|---|---|---|---|---|---|---|---|---|---|
| 2007-03-06 14:38 (*09:00) | Kxxxxx Systems Japan | Kxxxxx0001 | VIP | AAA3896X | XXXXXX | iRC 6800 | 11.93 | yes | DETAIL |
| 2007-03-06 14:36 (*09:00) | Kxxxxx Systems Japan | Kxxxxx0001 | VIP | AAA3896X | XXXXXX | iRC 3200 | 10.91 | no | DETAIL |
| 2007-03-06 14:36 (*09:00) | Kxxxxx Systems Japan | Kxxxxx0001 | VIP | AAA3896X | XXXXXX | iRC 6870 | 10.21 | yes | DETAIL |
| 2007-03-06 14:35 (*09:00) | Kxxxxx Systems Japan | Kxxxxx0001 | VIP | AAA3896X | XXXXXX | iRC 3200 | 10.91 | no | DETAIL |
| 2007-03-06 14:32 (*09:00) | Kxxxxx Systems Japan | Kxxxxx0001 | VIP | AAA3896X | XXXXXX | iRC 3200 | 10.91 | no | DETAIL |
| 2007-03-05 21:53 (*09:00) | Kxxxxx Systems Japan | Kxxxxx0001 | VIP | AAA3896X | XXXXXX | iRC 3200 | 10.91 | no | DETAIL |
| 2007-03-05 21:52 (*09:00) | Kxxxxx Systems Japan | Kxxxxx0001 | VIP | AAA3896X | XXXXXX | iRC 3200 | 10.91 | no | DETAIL |
| 2007-03-05 21:52 (*09:00) | Kxxxxx Systems Japan | Kxxxxx0001 | VIP | AAA3896X | XXXXXX | iRC 3200 | 10.91 | no | DETAIL |
| 2007-03-05 21:51 (*09:00) | Kxxxxx Systems Japan | Kxxxxx0001 | VIP | AAA3896X | XXXXXX | iRC 3200 | 10.91 | no | DETAIL |

2102

PAGE HAS BEEN DISPLAYED.    MY COMPUTER

FIG.22

| | FIRMWARE LIST | CURRENT VERSION | LATEST VERSION | UPGRADE DATE AND TIME | TRANSMISSION SCHEDULED DATE AND TIME | TRANSMISSION RESULT |
|---|---|---|---|---|---|---|
| ☑ | MN-CONT | 10.91 | 11.00 | 2006-12-21 16:48 | 2007-4-21 12:00 | ✓ |
| ☑ | R-CON | 04.01 | 05.00 | 2006-12-21 16:48 | 2007-4-21 12:00 | ✓ |
| ☐ | D-CON | xx.xx | xx.xx | 2006-12-21 16:48 | 2007-4-21 12:00 | ✗ |
| ☑ | LANG-xx | xx.xx | xx.xx | 2006-12-21 16:48 | 2007-4-21 12:00 | ✓ |
| ☑ | RUI | xx.xx | xx.xx | 2006-12-21 16:48 | 2007-4-21 12:00 | ✓ |
| ☐ | BOOTROM | xx.xx | xx.xx | 2006-12-21 16:48 | 2007-4-21 12:00 | ✓ |
| ☐ | MEAP | xx.xx | xx.xx | 2006-12-21 16:48 | 2007-4-21 12:00 | ✗ |
| ☑ | SDL-STCH | xx.xx | xx.xx | 2006-12-21 16:48 | 2007-4-21 12:00 | ✓ |
| ☐ | PUNCH | xx.xx | xx.xx | 2006-12-21 16:48 | 2007-4-21 12:00 | ✗ |
| ☑ | OCR-xx | xx.xx | xx.xx | 2006-12-21 16:48 | 2007-4-21 12:00 | ✓ |
| ☑ | TTS-xx | xx.xx | xx.xx | 2006-12-21 16:48 | 2007-4-21 12:00 | ✓ |
| ☑ | TIMESTMP | xx.xx | xx.xx | 2006-12-21 16:48 | 2007-4-21 12:00 | ✗ |
| ☑ | WEB-BRWS | xx.xx | xx.xx | 2006-12-21 16:48 | 2007-4-21 12:00 | ✓ |
| ☑ | HELP | xx.xx | xx.xx | 2006-12-21 16:48 | 2007-4-21 12:00 | ✓ |
| ☐ | WEBDEV | xx.xx | xx.xx | 2006-12-21 16:48 | 2007-4-21 12:00 | ✓ |

CURRENT FIRMWARE VERSION

| DEVICE ID | PRODUCT NAME | UPGRADE DATE AND TIME | FIRMWARE VERSION | LATEST VERSION? |
|---|---|---|---|---|
| XXX0000 | iRC XXXX | 2006-12-21 16:48 | 1.2 | no |

FIRMWARE UPGRADE INFORMATION
NORMAL VERSION UPGRADING    INDIVIDUAL VERSION UPGRADING
ENTIRE FIRMWARE VERSION
Version 2.2 ▶

FIRMWARE LIST

SET FIRMWARE TRANSMISSION DATE AND TIME
FIRMWARE TRANSMISSION SCHEDULED DATE (yyyy-mm-dd): 2007-01-01   FIRMWARE TRANSMISSION SCHEDULED TIME (hh:mm:ss): 23:15:00
APPLY TRANSMISSION DATE AND TIME | DOWNLOAD FIRMWARE
BACK 2201, 2202, 2203

IMAGE FORMING APPARATUS MONITORING SYSTEM AND METHOD THEREFOR

BACKGROUND OF THE INVENTION

1. Field of the Invention

The present invention relates to a system for upgrading firmware of an image forming apparatus. More specifically, the present invention relates to a method for replacing firmware of an image forming apparatus controlled by a plurality of types of firmware.

2. Description of the Related Art

A conventional monitoring system remotely monitors an operation state of a peripheral device, such as an image forming apparatus. In an environment in which the monitoring system like this is used, a conventional method upgrades firmware of an image forming apparatus in the following manner.

That is, in the case where it is necessary to upgrade the firmware due to previously performed version upgrading or an error occurring on the image forming apparatus, a service person in charge must personally visit the customer's business location, where the image forming apparatus is installed. In this case, the service person in charge manually upgrades the firmware. Accordingly, in the conventional method, high costs for upgrading the firmware may arise.

In this regard, in recent years, the conventional method stores firmware on a rewritable storage device, such as a flash memory, and transmits the firmware by an e-mail or other data communication method via the Internet to upgrade the firmware.

Furthermore, Japanese Patent Application Laid-Open No. 2004-165734 discusses a method for preventing the productivity from deteriorating in the case where it is necessary to immediately upgrade firmware due to an error that has occurred on the image forming apparatus.

In the method discussed in Japanese Patent Application Laid-Open No. 2004-165734, in the image forming apparatus on which an error on the firmware has occurred and whose firmware is to be upgraded with new firmware, it is determined which module is controlled by the new firmware. Furthermore, the operation of the module controlled by the new firmware, of control modules for an image reading unit or an image forming unit, is stopped while the operation of the other modules are continued.

SUMMARY OF THE INVENTION

The present invention is directed to a method for appropriately upgrading firmware and applying the upgraded firmware even if an error has occurred on an apparatus constituting an image forming apparatus monitoring system.

According to an aspect of the present invention, an image forming apparatus monitoring system includes an image forming apparatus configured to be controlled by a plurality of types of firmware, a monitoring server configured to monitor the image forming apparatus, and a transmission server configured to transmit firmware to the image forming apparatus, wherein the monitoring server includes a detection unit configured to detect an error occurring on the image forming apparatus based on operation information notified from the image forming apparatus, an identification unit configured to identify a type of firmware that has caused the error detected by the detection unit, and a firmware replacement instruction unit configured to issue an instruction for replacing a version of the type of firmware identified by the identification unit to the image forming apparatus, wherein the image forming apparatus includes a firmware transmission requesting unit configured to issue, to the transmission server, a request for transmitting a replacement version of the identified type of firmware, which has been instructed by the monitoring server to be replaced, a firmware receiving unit configured to receive the replacement version of the identified type of firmware transmitted from the transmission server and another type of firmware, whose version is to be replaced in association with the replacement version of the identified type of firmware, according to the request for transmitting the replacement version of the identified type of firmware issued by the firmware transmission requesting unit, and an application unit configured to apply each firmware received by the firmware receiving unit to the image forming apparatus, and wherein the transmission server includes a determination unit configured to, according to the request for transmitting the replacement version of the identified type of firmware issued from the image forming apparatus, determine the another type of firmware whose version is to be replaced in association with the replacement version of the identified type of firmware based on information about a combination of predetermined applicable firmware versions, and a firmware transmission unit configured to transmit the replacement version of the identified type of firmware and the another type of firmware determined by the determination unit to the image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

FIG. 2 illustrates an exemplary hardware configuration of a monitoring center host and a transmission server illustrated in FIG. 1 according to an exemplary embodiment of the present invention.

FIG. 3 illustrates an exemplary hardware configuration of a monitoring apparatus illustrated in FIG. 1 according to an exemplary embodiment of the present invention.

FIG. 4 illustrates an exemplary hardware configuration of another aspect of the monitoring apparatus illustrated in FIG. 1 according to an exemplary embodiment of the present invention.

FIG. 5 illustrates an exemplary hardware configuration of an image forming apparatus illustrated in FIG. 1 according to an exemplary embodiment of the present invention.

FIG. 10 illustrates an example of processing performed by the image forming apparatus monitoring system among the image forming apparatus, the transmission server, and the monitoring center host according to an exemplary embodiment of the present invention.

FIG. 11 illustrates the relationship between a table stored on a database of the transmission server and a file generated by the transmission server according to an exemplary embodiment of the present invention.

FIG. 12 illustrates a firmware error correspondence table stored in the monitoring center host (or on the database thereof) according to an exemplary embodiment of the present invention.

FIG. 13 illustrates an example of a log level management table according to an exemplary embodiment of the present invention.

FIG. 14 illustrates an example of a firmware version list table according to an exemplary embodiment of the present invention.

FIG. 15 illustrates an example of a firmware application order table according to an exemplary embodiment of the present invention.

FIG. 16 illustrates an example of a firmware information file according to an exemplary embodiment of the present invention.

FIG. 21 illustrates an example of a search screen displayed by the monitoring center host, which is used in upgrading and transmitting firmware, according to an exemplary embodiment of the present invention.

FIG. 22 illustrates an example of a detail screen displayed by the monitoring center host, which is used in upgrading and transmitting firmware, according to an exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
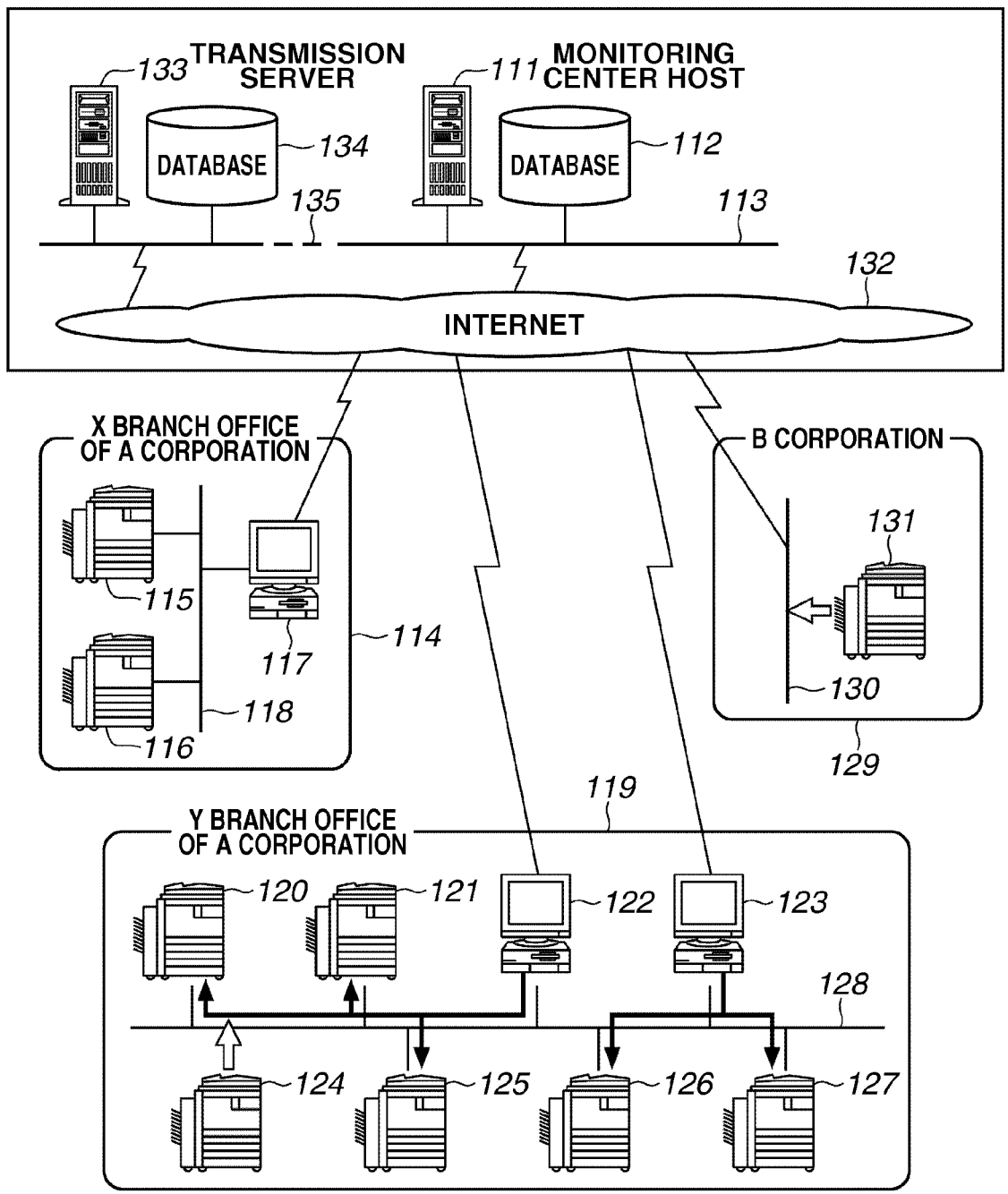
FIG. 1 illustrates an example of a configuration of an image forming apparatus monitoring system according to an exemplary embodiment of the present invention.

FIG. 1 illustrates an example of a configuration of an image forming apparatus monitoring system according to an exemplary embodiment of the present invention.

Referring to FIG. 1, the image forming apparatus monitoring system includes a monitoring center host (monitoring server) 111. Furthermore, the image forming apparatus monitoring system includes a database 112. The database 112 is a database that functions as a history storage unit for storing information related to monitoring, a counter for an image forming apparatus collected from the image forming apparatus installed at a customer's location, error history information, and an error pattern table.

The monitoring center host 111 and the database 112 are in communication with each other via a local area network (LAN) 113. The LAN 113 can connect to the Internet 132.

Note that it is also useful if the database 112 is physically provided within the monitoring center host 111. Furthermore, it is also useful if the database 112 is provided at a different specific location on a network that connects the database 112 with the monitoring center host 111 via the Internet 132 so that the database 112 can be accessed from the monitoring center host 111.

The monitoring center host 111 has a function for collecting information about the image forming apparatus, which is a target of monitoring, from monitoring apparatuses 117, 122, and 123 (to be described in detail later below) and an image forming apparatus 131 (to be described in detail later below) Here, the information about the image forming apparatus includes information about an operation state of the image forming apparatus (operation information including error information). Furthermore, the monitoring center host 111 has a function for storing the image forming apparatus operation information and performing predetermined processing on the stored image forming apparatus operation information. In addition, the monitoring center host 111 has a function for acquiring a warning or alarm from the monitoring apparatuses 117, 122, and 123 and the image forming apparatus 131 and transmitting the acquired alarm information to an external device. In this regard, the monitoring center host 111 has a function for transmitting the above-described information to a sales corporation host apparatus, for example.

Note here that the above-described operation state includes various operation state information, such as counter information, exhausted toner, door-open, drum replacement necessary, no cartridge, cooling fun operation error, error on base plate, stained document mounting glass, no staple, and paper feed sensor light amount too small, for example.

Note that the above-described operation state can further include various other operation state information, such as font memory overflow, rendering error, fixing device error, counter error, two-sided printing unit error, and paper jamming, for example.

In addition, the counter information can include various types of counter information, such as charging counter information, division counter information, size-by-size counter information, or part counter information. Here, the charging counter information indicates information about a counter value for the image forming apparatus used by each customer, which is a target of charging by a sales corporation. Furthermore, the division counter information indicates information about the amount of charge with respect to each division of the customer. Moreover, the size-by-size counter information indicates a counter value for each paper size. In addition, the part counter information indicates the level of consumption of each component part of the image forming apparatus.

Furthermore, the charging counter indicates the number of prints printed by the image forming apparatus so far. The division counter indicates the number of prints with respect to each division, which is set by the customer. With respect to the part counter, the number of revolutions is set as the counter for a rotational component, such as a drum, while the total operation time (seconds) is set as the counter for a part such as a scanner lamp, for example.

The operation information according to the present exemplary embodiment includes the above-described information about the operation state.

Furthermore, information about the image forming apparatus, which is the target of the monitoring by the monitoring center host 111, and the setting set for monitoring the image forming apparatus, which are transmitted to the sales corporation host (not illustrated), can be registered on the monitoring center host 111.

The monitoring center host 111 can merge and centrally manage the information about the monitoring target image forming apparatus and the monitoring setting for monitoring the image forming apparatus, which are registered on the monitoring center host 111. In addition, the monitoring center host 111 can perform a setting related to the monitoring on the monitoring apparatuses 117, 122, and 123 and the image forming apparatus 131.

Here, a service by the monitoring system is provided according to a contract between the sales corporation and the customer. Accordingly, only the image forming apparatus determined and designated by the sales corporation as the monitoring target according to the contract is set as the target of monitoring by the monitoring system.

Furthermore, the monitoring center host 111 provides, to a personal computer (PC) connected thereto via the Internet, a web page for viewing the information stored on the database 112 and processed information. The web page is provided with its viewing content being restricted according to a previously set viewing authority of each sales corporation, customer, or user that are authenticated by user authentication processing performed to view the same. Here, note that the above-described information can be not only viewed but also partially modified, changed, or edited by the user via the web page.

In addition, the image forming apparatus monitoring system includes a transmission server (distribution server) 133 and a database 134. The database 134 is a database that serves as a storage unit storing the firmware, an application and software license information.

The transmission server 133 and the database 134 are in communication with each other via a LAN 135. The LAN 135 can connect to the Internet. Note that it is also useful if the database 134 is physically provided within the transmission server 133.

Furthermore, it is also useful if the database 134 is provided at a different other location on a network on the Internet if the database 134 can be accessed from the transmission server 133. Note that the same LAN can be used as both the LAN 113 and the LAN 135. In addition, it is also useful to share data between the databases 134 and 112.

In the example illustrated in FIG. 1, only one set of the monitoring center host 111, database 112, transmission server 133, and database 134 is illustrated. However, in actual cases, a plurality of monitoring center hosts and databases may perform processing in a distributed manner so as to distribute the load of collecting information from a large number of image forming apparatuses and monitoring apparatuses and transmitting the firmware.

Furthermore, alternatively, it is also useful to implement the functions of the monitoring center host 111 and the transmission server 133 with a single apparatus.

Now, an exemplary configuration of a customer system will be described in detail below.

An environment at a customer's place can include a plurality of different environments. The example illustrated in FIG. 1 includes customer systems 114, 119, and 129.

In the customer system 114 (for example, a customer system installed at X Branch Office of A Corporation), image forming apparatuses 115 and 116, which are connected to a LAN 118 (connected with the system via the Internet 132), are monitored by a monitoring apparatus 117. The monitoring apparatus 117 communicates with the monitoring center host 111 via the Internet 132.

On the other hand, in the customer system (for example, a customer system installed at Y Branch Office of A Corporation), the image forming apparatus on a LAN 128 is managed by monitoring apparatuses 122 and 123. Image forming apparatuses 120, 121, 124, and 125 are managed by the monitoring apparatus 122, while image forming apparatuses 126 and 127 are managed by the monitoring apparatus 123.

Monitoring apparatuses 117, 122, and 123 are connected to a database (not illustrated). The monitoring apparatus 117 stores the information collected from the image forming apparatuses 115 and 116.

Furthermore, the monitoring apparatus 117 stores a result of the processing performed on the stored data. Similarly, the monitoring apparatus 122 stores the information collected from the image forming apparatuses 120, 121, 124, and 125 and stores a result of the processing performed on the stored data.

Furthermore, similarly, each of the monitoring apparatuses 122 and 123 stores the information collected from the image forming apparatuses 126 and 127 and stores a result of the processing performed on the stored data.

Furthermore, the monitoring apparatuses 117, 122, and 123 store a setting set related to the monitoring of the image forming apparatus on the database (not illustrated).

Note that it is also useful if a database connected to the LAN 118 or 128 is independently and separately provided.

In addition, it is also useful if a database (not illustrated) is provided at a different location on the network connected to the image forming apparatus monitoring system via the internet, if the database (which is not illustrated) can be accessed from the monitoring apparatuses 117, 122, and 123.

Furthermore, every time the monitoring apparatuses 117, 122, and 123 receive the status information about the image forming apparatus (information indicating that an error has occurred on the image forming apparatus, for example) therefrom, the monitoring apparatuses 117, 122, and 123 transmit the received image forming apparatus status information to the monitoring center host 111.

In the customer system 129 (B Corporation), the image forming apparatus 131, which is connected to the LAN 130 (connected to the image forming apparatus monitoring system via the Internet 132), itself is directly in communication with the monitoring center host 111 via the Internet 132. The image forming apparatus 131 has the same function as that of the monitoring apparatuses 117, 122, and 123.

With the above-described configuration, the image forming apparatus 131 positively and spontaneously transmits information (information such as the counter information or error information) about itself (the image forming apparatus 131) to the monitoring center host 111.

In the present exemplary embodiment, it is necessary to pay attention to the following points.

(1) Hypertext Transport Protocol (HTTP)/Simple Object Access Protocol (SOAP) can be utilized in the communication via the Internet performed with the above-described configuration.

The SOAP is a protocol for calling data and service stored in one computer from a different another computer based on eXtended Markup Language (XML).

In the present exemplary embodiment, the SOAP is implemented on HTTP. In the communication by the SOAP, a SOAP message including an XML document added with collateral information is transmitted and received.

Accordingly, a computer that supports the SOAP includes a SOAP message generation unit for generating a SOAP message and a SOAP message interpretation unit for interpreting the SOAP message.

In the present exemplary embodiment, the SOAP message including information about the status of the image forming apparatus is transmitted to the monitoring center host 111.

(2) As described above, each image forming apparatus installed in the sites of A Corporation communicates with the monitoring center host 111 via the monitoring apparatus. However, the present exemplary embodiment is not limited to this. That is, by changing the setting, each of the above-described image forming apparatuses installed in the sites of A Corporation can communicate with the monitoring center host 111 by bypassing the monitoring apparatus, as the image forming apparatus 131 installed in the site of B Corporation can.

FIG. 2 illustrates an exemplary hardware configuration of the monitoring center host 111 and the transmission server 133 illustrated in FIG. 1.

Referring to FIG. 2, a central processing unit (CPU) 201 controls each processing performed by the monitoring center host 111 or the transmission server 133.

A read-only memory (ROM) 203 stores a program and data related to each processing performed by the monitoring center host 111 or the transmission server 133. The ROM 203 is a read-only (unrewritable) memory, as described above.

A random access memory (RAM) 204 can electrically store temporary data related to each processing performed by the monitoring center host 111 or the transmission server 133. The RAM 204 is a rewritable memory that can be randomly accessed.

A hard disk drive (HDD) 205 stores a program and data related to each processing performed by the monitoring center host 111 or the transmission server 133, data to be temporarily stored, information about the image forming apparatus, which is the monitoring target apparatus, and information collected from the image forming apparatus. More specifically, a part counter value, a charging counter value, and a division counter value, for example, are stored on the HDD 205.

In the case of the monitoring center host 111, the program for the processing illustrated in the flow chart of FIG. 6 and FIG. 19, which will be described in detail later below, are stored on the HDD 205. This program uses the RAM 204 as the temporary storage area and is called (read) and executed with the CPU 201.

In the case of the transmission server 133, the program illustrated in the flow chart of FIG. 6 and FIG. 18, which will be described in detail later below, are stored on the HDD 205. This program uses the RAM 204 as the temporary storage area and is called (read) and executed with the CPU 201.

The input device 207 includes an input device, such as a keyboard, and a pointing device, such as a mouse, via which an instruction and an input on the monitoring center host 111 or the transmission server 133 by the user are received.

The display unit 208 displays operation status information about the monitoring center host 111 or the transmission server 133 and information output by each program operating thereon.

A network interface (I/F) 209 is an interface between the monitoring center host 111 or the transmission server 133 and the LAN and the Internet via a network. Thus, the monitoring center host 111 and the transmission server 133 can perform data communication with an external device that is in communication therewith via the network. An external device I/F 210 is an interface between the monitoring center host 111 or the transmission server 133 and an external device. The above-described components are in communication with one another via a system bus 211. Thus, data can be transmitted and received among the above-described components.

FIG. 3 illustrates an exemplary hardware configuration of the monitoring apparatuses 117, 122, and 123 illustrated in FIG. 1.

Referring to FIG. 3, a CPU 301 controls each processing performed by the monitoring apparatus 117, 122, or 123.

A ROM 302 stores the program and the data related to each processing performed by the monitoring apparatus 117, 122, or 123. The ROM 302 is a read-only (unrewritable) memory. A RAM 303 can electrically store temporary data related to each processing performed by the monitoring apparatus 117, 122, or 123. The RAM 303 is a rewritable memory that can be randomly accessed.

In the monitoring apparatuses 117, 122, and 123, a program and data related to each processing performed by the monitoring apparatus 117, 122, or 123, data to be temporarily stored, information about the image forming apparatus, which is the monitoring target apparatus, and information collected therefrom are stored on an HDD 304.

An input device 305 includes an input device, such as a keyboard, and a pointing device, such as a mouse, via which an instruction and an input on the monitoring apparatus 117, 122, or 123 by the user are received. A display unit 306 displays operation status information about the monitoring apparatus 117, 122, or 123 and information output by each program operating thereon.

A network I/F 307 is an interface between the monitoring apparatus 117, 122, or 123 and the LAN and the Internet via a network. Thus, the monitoring apparatus 117, 122, or 123 can perform data communication with an external device that is in communication therewith via the network. An external device I/F 308 is an interface between the monitoring apparatus 117, 122, or 123 and the external device. The above-described components are in communication with one another via a system bus 309. Thus, data can be transmitted and received among the above-described components.

FIG. 4 illustrates an exemplary hardware configuration of another aspect of the monitoring apparatuses 117, 122, and 123 illustrated in FIG. 1.

Referring to FIG. 4, the CPU 401 controls each processing performed by the monitoring apparatus 117, 122, or 123. A ROM 402 stores a program and data related to each processing performed by the monitoring apparatus 117, 122, or 123. The ROM 402 is a read-only (unrewritable) memory.

A flash ROM 403 stores data related to each processing performed by the monitoring apparatus 117, 122, or 123 and data to be temporarily stored, information about the image forming apparatus, which is the monitoring target apparatus, and information collected therefrom.

If the program operating on the monitoring apparatus 117, 122, or 123 has output error information or an error log, a serial I/F 404 can be used to communicate with an external terminal device via a serial cable connected thereto. A network I/F 405 is an interface between the monitoring apparatus 117, 122, or 123 and the LAN and the Internet via a network. Thus, the monitoring apparatus 117, 122, or 123 can perform data communication with an external device that is in communication therewith via the network. The above-described components are in communication with one another via a system bus 406. Thus, data can be transmitted and received among the above-described components.

FIG. 5 illustrates an exemplary hardware configuration of each of the image forming apparatuses 115, 116, 120, 121, 124, 125, 126, 127, and 131 illustrated in FIG. 1.

Note here that various types of image forming apparatuses can be used as the image forming apparatuses 115, 116, 120, 121, 124, 125, 126, 127, and 131. More specifically, a multifunction peripheral (MFP) integrally having a plurality of functions, such as a printer function and a facsimile function, a printer that receives data from a PC and prints the received data (including an electrophotographic printer and an ink jet printer), a scanner, or a facsimile transmission apparatus can be used as the image forming apparatuses 115, 116, 120, 121, 124, 125, 126, 127, and 131. In the example illustrated in FIG. 5, an MFP is illustrated as an example of the image forming apparatus according to the present exemplary embodiment.

Referring to FIG. 5, the MFP (the image forming apparatuses 115, 116, 120, 121, 124, 125, 126, 127, and 131) includes an image reader 502 for reading an image of a document fed thereto by a document feeding unit 501. The image reader 502 and an image forming unit 503 converts the read document image and data received via the network into a print image and prints out the image. A sheet of recording paper having the printed image thereon is discharged by a paper discharge unit 504 and is then subjected to post-processing such as sorting and stapling.

A network I/F 505 is an interface between the image forming apparatuses 115, 116, 120, 121, 124, 125, 126, 127, and 131 and the LAN and the Internet via a network. Thus, the image forming apparatus can perform data communication with an external device that is in communication therewith via the network.

A CPU 506 controls each processing performed by the image forming apparatuses 115, 116, 120, 121, 124, 125, 126, 127, or 131. The CPU 506 monitors the operation status of the image forming apparatus. If a specific event, such as an error, has occurred, then the CPU 506 transmits status information indicating the state to a predetermined transmission destination. The transmission destination includes the monitoring center host 111 or the monitoring apparatuses (117, 122, and 123), for example.

A ROM 507 is a non-volatile storage (memory) unit. The ROM 507 stores a program and data related to each processing performed by the image forming apparatuses 115, 116, 120, 121, 124, 125, 126, 127, or 131. A RAM 508 electrically stores temporary data related to each processing performed by the image forming apparatus 115, 116, 120, 121, 124, 125, 126, 127, or 131. The RAM 508 is a rewritable memory device that can be randomly accessed.

An HDD 509 stores a program and data related to each processing performed by the image forming apparatuses 115, 116, 120, 121, 124, 125, 126, 127, or 131, data to be temporarily stored, and user data that has been transmitted to the image forming apparatus 115, 116, 120, 121, 124, 125, 126, 127, or 131.

The image forming apparatuses 115, 116, 120, 121, 124, 125, 126, 127, and 131 can be controlled by a plurality of types of firmware (MN-CONT, R-CON, D-CON, BOOTROM, PUNCH, SDL-STCH, and MEAP, which will be described in detail later below with reference to FIG. 14). The firmware is stored in an appropriate area of the HDD 509.

Figure 8:
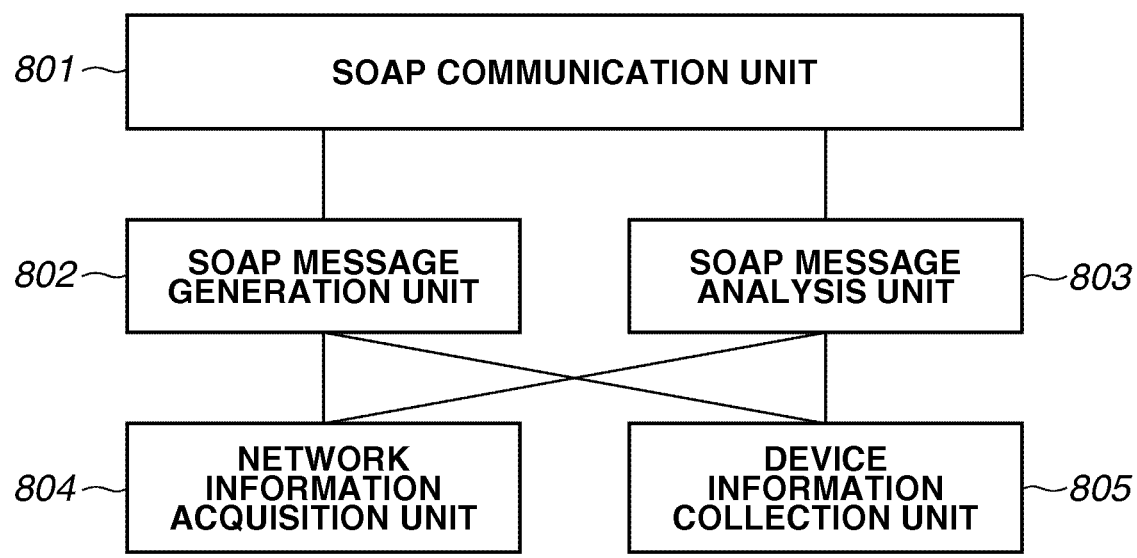
FIG. 8 illustrates an exemplary software configuration of the image forming apparatus illustrated in FIG. 1 with respect to modules and units related to the image forming apparatus monitoring system according to an exemplary embodiment of the present invention.
Figure 20:
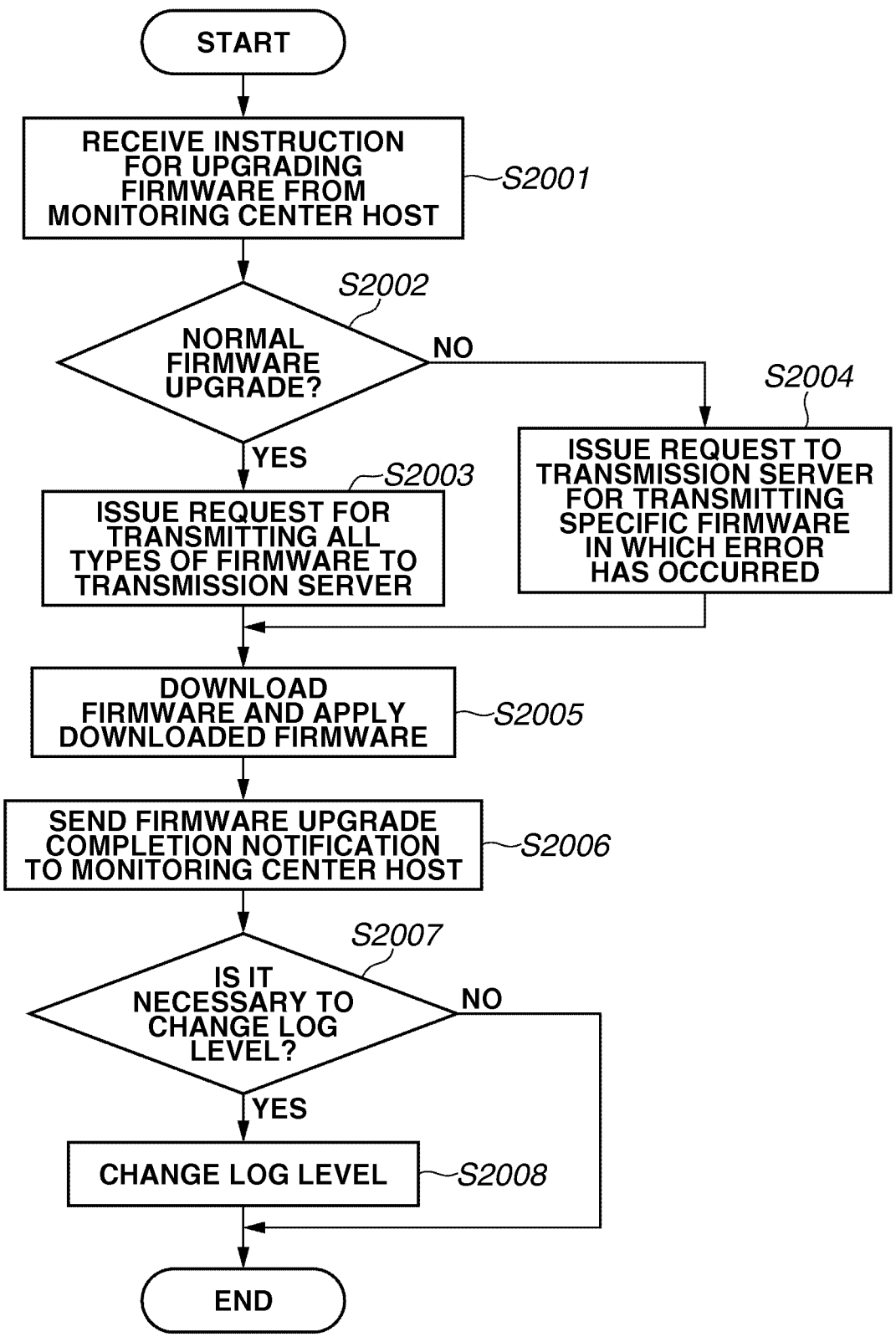
FIG. 20 is a flow chart that illustrates an example of an operation performed by the image forming apparatus during the firmware upgrading processing according to an exemplary embodiment of the present invention.

Furthermore, the image forming apparatuses includes a program for processing performed according to flow charts of FIGS. 8 and 20 on the HDD 509. The program and each of the above-described firmware use the RAM 508 as a temporary storage area and are called (read) and executed with the CPU 506.

An operation unit 510 receives an instruction and an input performed by a user on the image forming apparatus 115, 116, 120, 121, 124, 125, 126, 127, or 131.

A display unit 511 displays operation status information about the image forming apparatus and information about a user operation performed via the operation unit 510. The above-described components are in communication with one another via a system bus 512. Thus, data can be transmitted and received among the components.

Note here that in the case of the image forming apparatus 131, which has a function for positively and spontaneously transmitting monitoring information, a program and data related to the monitoring data transmitting processing are stored on the ROM 507 or the HDD 509.

Figure 6:
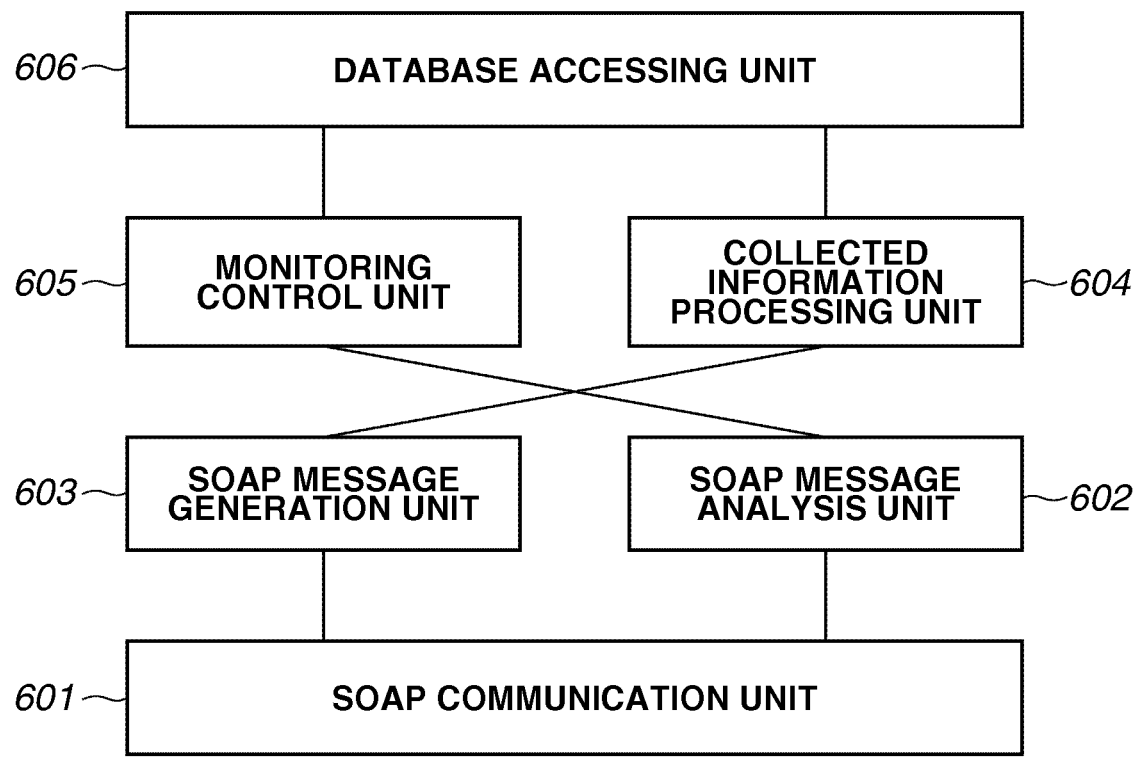
FIG. 6 illustrates an exemplary software configuration of the monitoring center host and the transmission server illustrated in FIG. 1 with respect to modules and units related to the image forming apparatus monitoring system according to an exemplary embodiment of the present invention.

FIG. 6 illustrates an exemplary software configuration of components of the monitoring center host 111 (FIG. 1) and the transmission server 133 (FIG. 1) in the image forming apparatus monitoring system, primarily with respect to those related to the image forming apparatus monitoring system.

Referring to FIG. 6, a SOAP communication unit 601 receives SOAP data from the monitoring apparatus 117 or the image forming apparatus 131 via the network I/F 209 and then transfers the received SOAP data to a SOAP message analysis unit 602.

Furthermore, the SOAP communication unit 601 transmits SOAP data generated by a SOAP message generation unit 603 to the monitoring apparatus 117 or the image forming apparatus 131 via the network I/F 209.

A collected information processing unit 604 stores the information received from the monitoring apparatus 117 or the image forming apparatus 131, which is the monitoring target apparatus, on the database 112 or the database 134 via a database access unit 606 after performing data processing on the received information or without performing any data processing thereon.

Furthermore, the collected information processing unit 604 implements a function related to a remote monitoring system. In this regard, the collected information processing unit 604 notifies total counter value information, error information, and firmware latest version information to a service person in charge and the customer according to the information received from the monitoring apparatus 117 or the image forming apparatus 131, which is the monitoring target apparatus, and the data stored on the database 112 and the database 134.

A monitoring control unit 605 manages a schedule of acquiring the information about the monitoring apparatus 117 or the image forming apparatus 131. Furthermore, the monitoring control unit 605 controls the content to be monitored and the monitoring method.

In addition, the monitoring control unit 605 issues an instruction to the monitoring apparatus 117 or the image forming apparatus 131, which is the monitoring target apparatus, via the SOAP message generation unit 603, the SOAP communication unit 601, and the network I/F 209, as necessary.

Figure 7:
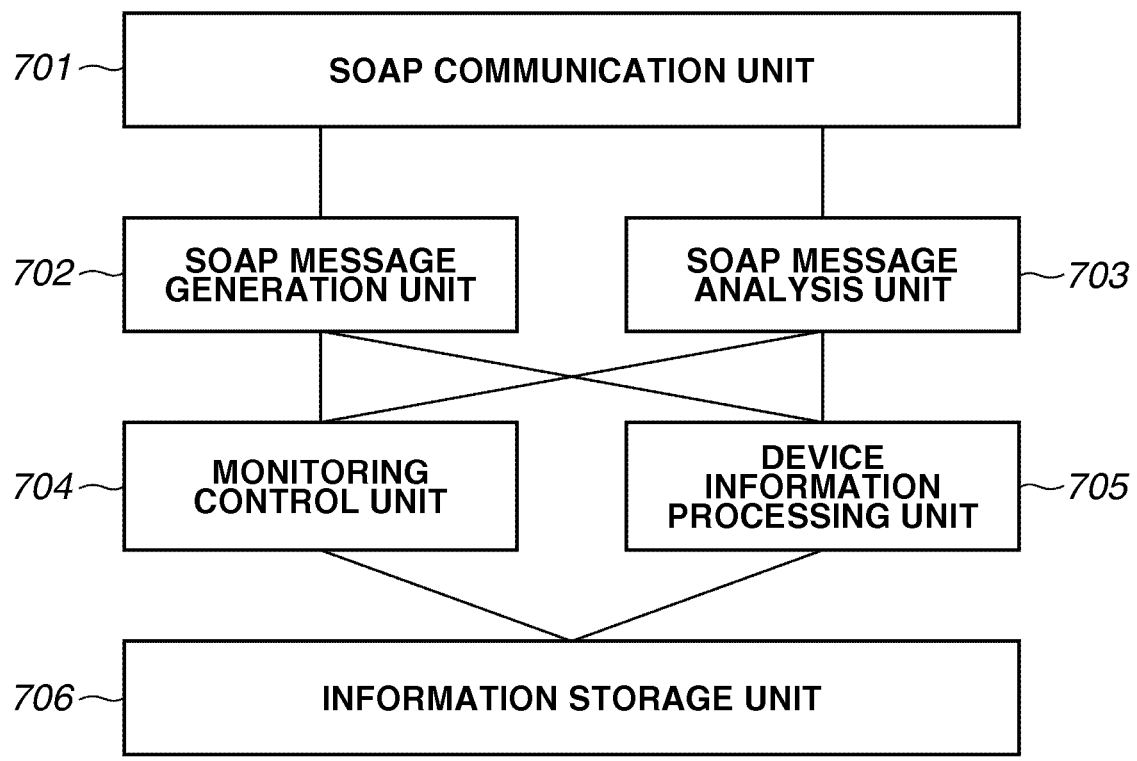
FIG. 7 illustrates an exemplary software configuration of the monitoring apparatus illustrated in FIG. 1 with respect to modules and units related to the image forming apparatus monitoring system according to an exemplary embodiment of the present invention.

FIG. 7 illustrates an exemplary software configuration of components of the monitoring apparatuses 117, 122, and 123 in the image forming apparatus monitoring system illustrated in FIG. 1, focusing on those related to the image forming apparatus monitoring system. In the following description, the monitoring apparatus 117 only is described. However, the monitoring apparatuses 122 and 123 have the same configuration described below with respect to the monitoring apparatus 117.

Referring to FIG. 7, a SOAP communication unit 701 receives SOAP data from the monitoring center host 111 via the network I/Fs 307 and 405 and then transfers the received SOAP data to a SOAP message analysis unit 703.

In addition, the SOAP communication unit 701 transmits SOAP data generated by a SOAP message generation unit 702 to the monitoring center host 111 and the transmission server 133 via the network I/Fs 307 and 405.

A monitoring control unit 704 updates information about the monitoring target image forming apparatus, which is stored in an information storage unit 706, according to a monitoring setting transmitted from the monitoring center host 111. Here, the monitoring setting will be described in detail later below. Furthermore, the monitoring control unit 704 acquires information about the image forming apparatuses 115 and 116 to manage the schedule.

According to the schedule managed by the monitoring control unit 704, a device information processing unit 705 stores various information on the information storage unit 706. Here, the various information stored on the information storage unit 706 includes counter information and error information, such as service call, paper jamming, or no toner, which is positively collected (acquired) by the monitoring apparatus 117 from the image forming apparatuses 115 and 116. The processing for storing the above-described information on the information storage unit 706 can be alternatively performed according to the operation status of the image forming apparatuses 115 and 116.

The data stored on the information storage unit 706 is transferred as it is to the SOAP message generation unit 702 via the device information processing unit 705. Then, the transferred data is transmitted to the monitoring center host 111.

Alternatively, the data stored on the information storage unit 706 can be interpreted and data-processed within the device information processing unit 705 before transferring the same to the SOAP message generation unit 702 and then to the monitoring center host 111.

FIG. 8 illustrates an exemplary software configuration of components of the image forming apparatuses 115, 116, 120, 121, 124, 125, 126, 127 and 131 illustrated in FIG. 1, focusing on components related to the image forming apparatus monitoring system.

Referring to FIG. 8, a SOAP communication unit 801 receives SOAP data from the monitoring center host 111 and the transmission server 133 via the network I/F 505 and then transfers the received SOAP data to a SOAP message analysis unit 803.

In addition, the SOAP communication unit 801 transmits SOAP data generated by a SOAP message generation unit 802 to the monitoring center host 111 and the transmission server 133 via the network I/F 505.

A network information acquisition unit 804 can automatically acquire an Internet protocol (IP) address, a Domain Name Server (DNS) address, and a gateway address in a dynamic host configuration protocol (DHCP) environment.

Furthermore, if the user has input network information via the operation unit 510 and stored the same on the HDD 509, then the network information acquisition unit 804 acquires the network information from the HDD 509.

A device information collection unit 805 acquires the counter information, which has been previously stored within the monitoring apparatus 117 according to the schedule of processing by the image forming apparatus or according to an instruction from the monitoring center host 111. Furthermore, the device information collection unit 805 acquires information about an error that has occurred within the image forming apparatus, such as service call, paper jamming, or no toner.

The data acquired in the above-described manner, is transferred to the SOAP message generation unit 802 as it is, then is transmitted to the monitoring center host 111.

The data acquired in the above-described manner can be transferred to the SOAP message generation unit 802 as it is and then to the monitoring center host 111. Alternatively, the data acquired in the above-described manner can be transferred to the SOAP message generation unit 802 as it is and then to the monitoring center host 111 after storing, interpreting, and data-processing the same within the device information collection unit 805.

Figure 9:
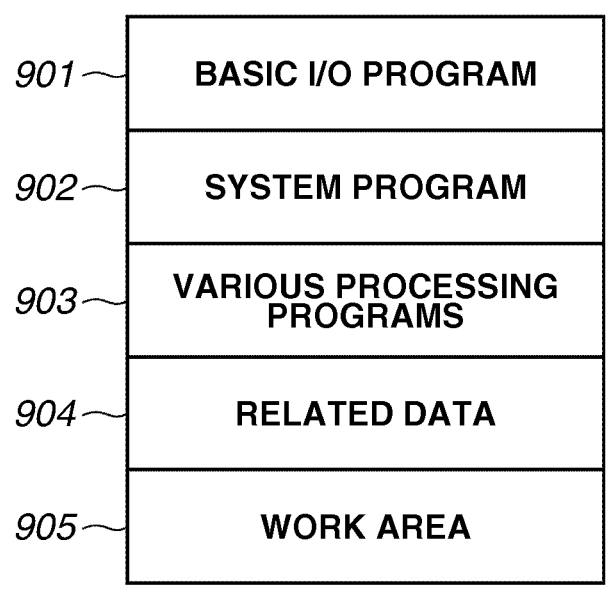
FIG. 9 illustrates an exemplary memory map of each of the monitoring center host, the transmission server, the monitoring apparatus, and the image forming apparatus according to an exemplary embodiment of the present invention.

FIG. 9 illustrates an exemplary memory map of the monitoring center host 111 and the transmission server 133, or the monitoring apparatuses 117, 122, and 123, or the image forming apparatuses 115, 116, 120, 121, 124, 125, 126, 127, and 131 according to the present exemplary embodiment. The memory map illustrated in FIG. 9 corresponds to a memory map of a program loaded on the RAM 204 in the case of the monitoring center host 111. On the other hand, the memory map illustrated in FIG. 9 corresponds to a memory map of a program loaded on the RAM 303 or the flash ROM 403 in the case of the monitoring apparatus 117. Furthermore, the memory map illustrated in FIG. 9 corresponds to a memory map of a program loaded on the RAM 508 in the case of each of the image forming apparatuses.

The memory map is constituted by a basic input/output (I/O) program 901, a system program 902, various types of processing programs 903, such as the processing program according to the present exemplary embodiment, a related data storage area 904, and a program work area 905.

The basic I/O program 901 controls an input and an output on and from the image forming apparatuses 115, 116, 120, 121, 124, 125, 126, 127, or 131. The system program 902 provides an operation environment with respect to each processing program.

Note that if the capacity of the area used as the portions for storing the basic I/O program 901, the system program 902, the processing programs 903, the related data storage area 904, and the program work area 905 is not large enough due to the restriction on the capacity, the HDD 205 can be used as a portion of the RAM 204. In the same way, the HDD 304 and the HDD 509 can be used as a portion of the corresponding RAM 303 and the RAM 508, respectively.

Figure 18:
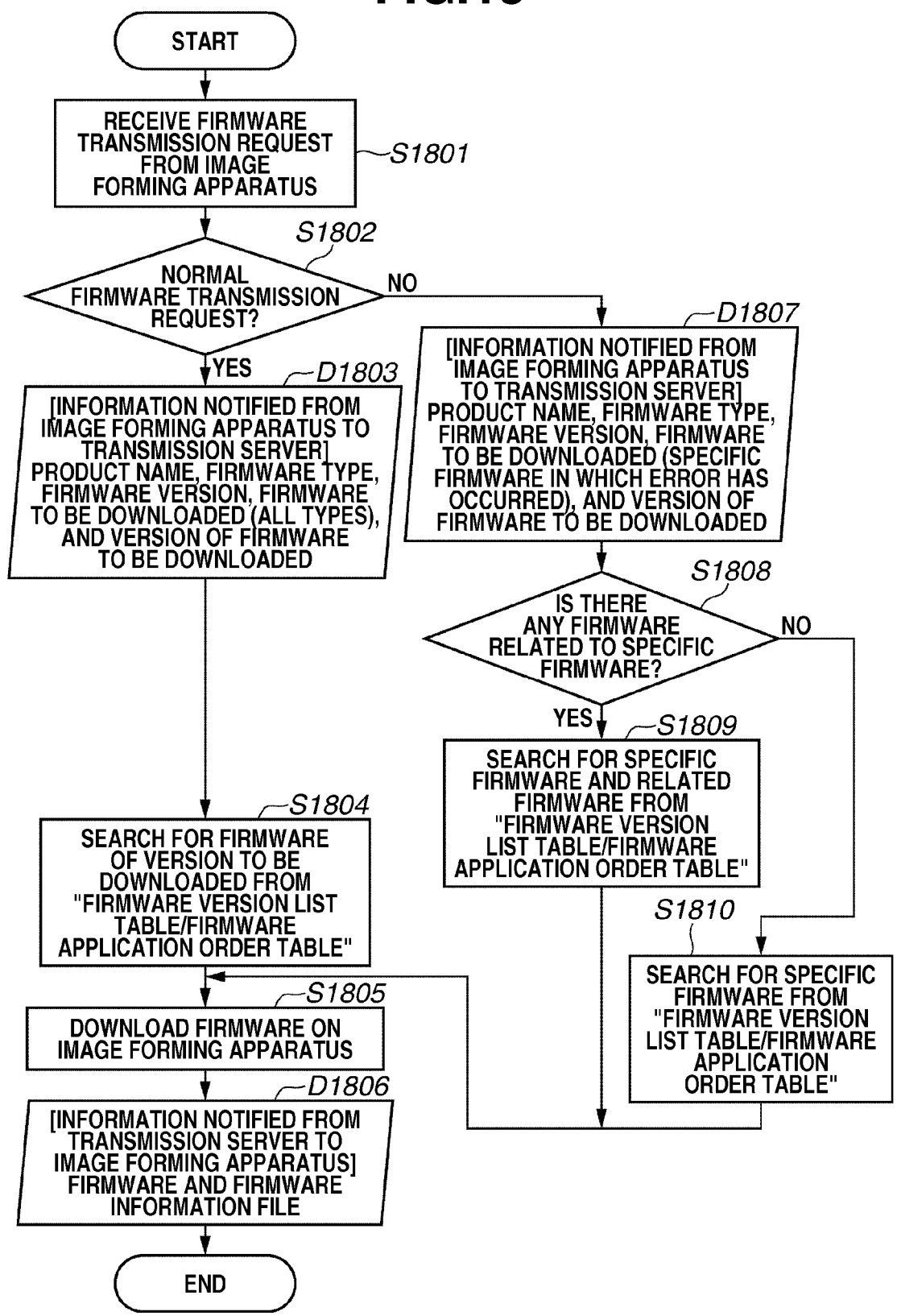
FIG. 18 is a flow chart that illustrates an example of an operation performed by the transmission server during firmware upgrading processing according to an exemplary embodiment of the present invention.

In the case of the transmission server 133, the program corresponding to the flow chart illustrated in FIG. 18 is stored in the various types of processing programs portion 903.

Figure 19:
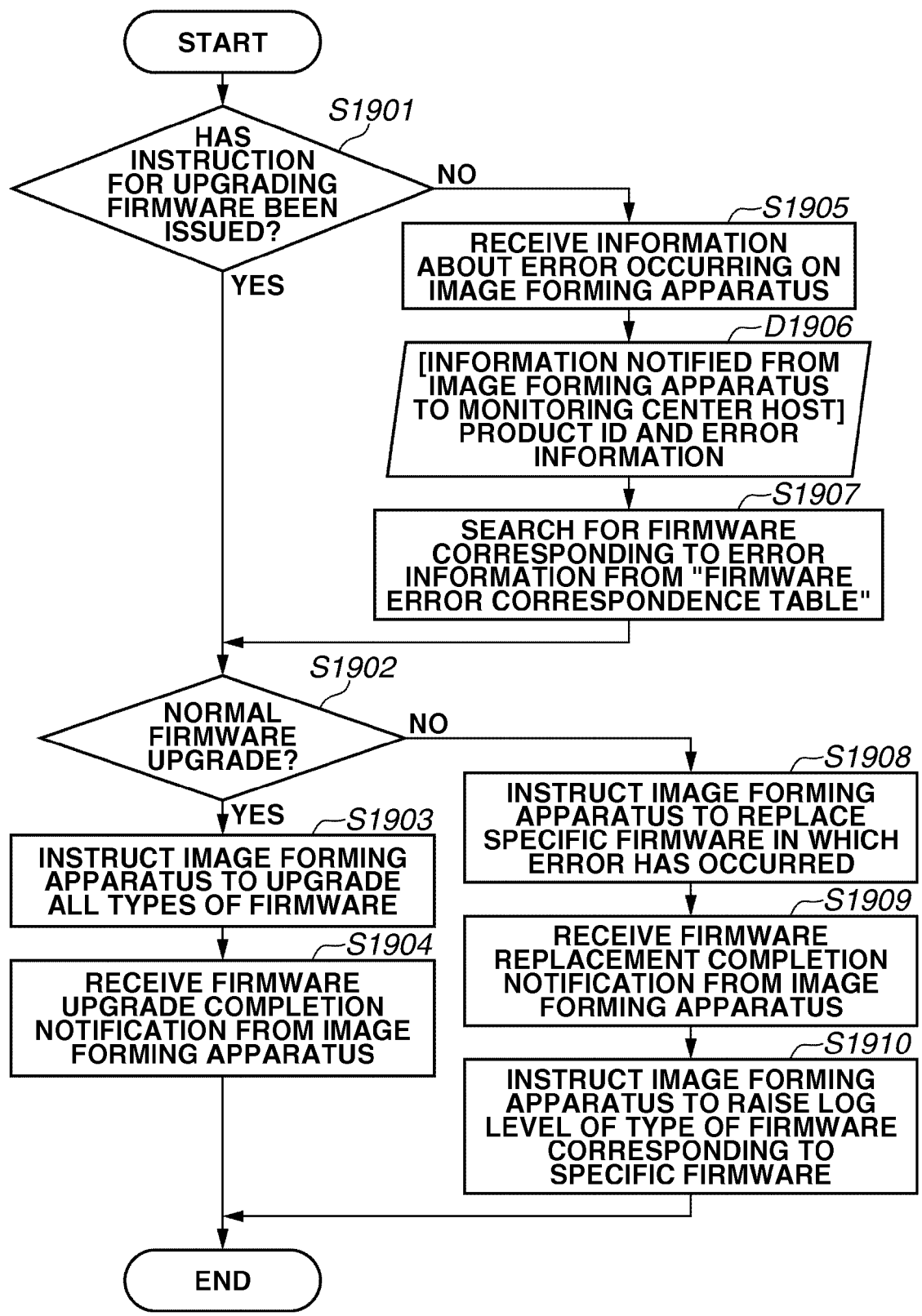
FIG. 19 is a flow chart that illustrates an example of an operation performed by the monitoring center host during the firmware upgrading processing according to an exemplary embodiment of the present invention.

Furthermore, in the case of the monitoring center host 111, the program corresponding to the flow chart illustrated in FIG. 19 is stored in the various types of processing programs portion 903. In the case of the image forming apparatus 131, the program corresponding to the flow chart illustrated in FIG. 20 is stored in the various types of processing programs portion 903.

Now, a series of operations performed among the image forming apparatus, the transmission server 133, and the monitoring center host 111 will be described in detail below with reference to FIGS. 10 through 22.

In the following description, the image forming apparatus 131, among the image forming apparatuses, is primarily described. However, the same configuration applies to a combination of each of the other image forming apparatuses 115, 116, 120, 121, 124, 125, 126, and 127 with each of the monitoring apparatuses 117, 122, and 123.

FIG. 10 schematically illustrates the image forming apparatus 131, the transmission server 133, and the monitoring center host 111 according to the present exemplary embodiment.

FIG. 11 illustrates an exemplary relationship between a table stored on the database 134 of the transmission server 133 and a file generated by the transmission server 133 according to the present exemplary embodiment.

To begin with, the series of operations performed among the image forming apparatus, the transmission server 133, and the monitoring center host 111 will be described in detail below with reference to FIG. 10.

Referring to FIG. 10, the monitoring center host 111 issues, to the image forming apparatus 131, an instruction 1001 for upgrading the firmware. More specifically, here, information about the firmware to be transmitted (all types) and information indicating the version of the firmware to be upgraded are included in the instruction.

In the present exemplary embodiment, it is supposed that the version of the firmware that is currently installed on the image forming apparatus 131 is "Version 1.2" (as indicated in a version column 1102 in FIG. 11) and that the version of the firmware instructed by the monitoring center host 111 as the upgrading version is "Version 2.1" (as indicated in a version column 1103 in FIG. 11).

A firmware version list table 1101 illustrated in FIG. 11 indicates a combination of the versions of all types of the firmware stored on the transmission server 133 (or the database 134) and the monitoring center host 111 (or the database 112).

Note here that the firmware version list table 1101 includes a combination of the versions of all types of firmware, as described above, but the present exemplary embodiment is not limited to store all types of firmware which are used in a product thereof (the image forming apparatus).

That is, for example, it is also useful if the firmware which does not affect the firmware of a different other type is not included in the firmware version list table 1101.

Referring to FIG. 11, the firmware of the image forming apparatus 131 has a number of types. Each of the types of firmware has a respective version. For example, MN-CONT 1104 is a main controller of the image forming apparatus 131.

Furthermore, R-CON 1105 is a controller of an image reading unit. A combination of the plurality of types of firmware is set as one version (Version 1.2 described in the version field 1102, for example). The firmware of the image forming apparatus 131 is usually upgraded according to the version set in this manner.

In processing 1002 illustrated in FIG. 10, the image forming apparatus 131 issues, to the transmission server 133, a request for downloading the firmware.

At this time, the image forming apparatus 131 transmits, to the transmission server 133, information about the firmware of the image forming apparatus 131, a product name, and information about the version to be transmitted.

After receiving the above-described information from the image forming apparatus 131, the transmission server 133 searches for appropriate firmware based on the received firmware information about the image forming apparatus 131, the product name of the image forming apparatus 131, and the version of the firmware to be transmitted to the image forming apparatus 131 (processing 1003 illustrated in FIG. 10).

The processing 1003 (FIG. 10) is described in more detail with reference to FIG. 11. In this regard, at first, the transmission server 133 searches the firmware version list table 1101 by using a product name 1106 ("iRXXXX"), which has been previously transmitted from the image forming apparatus 131, as a search key.

After that, based on the firmware information about the firmware and the information about the version to be transmitted, which have been transmitted from the image forming apparatus 131, the transmission server 133 determines what version of the firmware is to be applied.

In this case, the information about the current version that has been transmitted from the image forming apparatus 131 is "Version 1.2" while the information about the version to be transmitted is "Version 2.2". Accordingly, the transmission server 133 determines that the "Version 2.2", which is the latest version of "iRXXXX", is to be applied.

Here, the transmission server 133 considers the combination and an application order for the firmware of the image forming apparatus 131.

A firmware application order table 1111 stores an order of applying the plurality of types of firmware. More specifically, the firmware application order table 1111 stores data such as application order 1112. The application order 1112 is set corresponding to the product name and the type of the firmware.

The transmission server 133 generates a firmware information file 1113 based on the firmware version list table 1101 and the firmware application order table 1111.

Then, in processing 1004 illustrated in FIG. 10, the transmission server 133 downloads (transmits) the firmware onto the image forming apparatus 131. At the same time, the transmission server 133 also transmits the firmware information file 1113 to the image forming apparatus 131.

Then, in processing 1005 illustrated in FIG. 10, the image forming apparatus 131, considering the combination and the application order of the firmware, upgrades the firmware based on the firmware information file 1113.

In this case, after disabling all the current firmware, the image forming apparatus 131 refers to the firmware information file 1113 and enables the firmware according to the application order.

In the present exemplary embodiment, the firmware does not appropriately operate unless it is stored on the HDD 509 of the image forming apparatus 131 at an appropriate location. By utilizing this characteristic, the firmware can be enabled or disabled.

More specifically, in disabling the firmware, all the firmware is displaced to the location different from the appropriate location. On the other hand, in enabling the firmware, the firmware is displaced to the appropriate location. In this manner, the firmware can be enabled or disabled.

Note here that it is also useful if the disabled firmware is deleted. Alternatively, it is also useful if the disabled firmware is stored at the location different from the appropriate location as a backup.

In processing 1005 (FIG. 10), the image forming apparatus 131 upgrades the firmware. If the firmware has been successfully upgraded in the processing 1005, then, the processing advances to processing 1006 in FIG. 10. In the processing 1006, the image forming apparatus 131 transmits a notification indicating that the firmware has been successfully upgraded to the monitoring center host 111.

By performing processing 1001 to 1006 (FIG. 10), the firmware of the image forming apparatus 131 is upgraded to the latest version. The latest firmware is operated in the customer system as it is.

Processing operations 1007 through 1015 in FIG. 10 correspond to processing performed if an error has occurred on the image forming apparatus 131 while the image forming apparatus 131 operates in the customer system.

Suppose here that in an operation 1007 (FIG. 10), scan errors have frequently occurred after the upgrading of the firmware.

In this case, the image forming apparatus 131 notifies information about the error that has occurred thereon to the monitoring center host 111.

FIG. 12 illustrates an example of a firmware error correspondence table stored on the monitoring center host 111 (or the database 122).

If an error has occurred on the image forming apparatus 131 and the monitoring center host 111 has received error information about the error, then the monitoring center host 111 determines whether the error is related to the firmware by referring to the firmware error correspondence table.

More specifically, whether the error is related to the firmware can be determined based on the frequency of occurrence of the error, the alarm, and the paper jamming, which are previously linked with each firmware type.

A firmware type 1201 in the firmware error correspondence table illustrated in FIG. 12 indicates the type of firmware installed on the image forming apparatus 131.

A corresponding error 1202 indicates the content of the error, alarm, or paper jamming that has occurred on the image forming apparatus 131. Here, the corresponding error 1202 is registered in a column for the corresponding firmware type.

A frequency of occurrence (threshold value) 1203 indicates a threshold value for the frequency of occurrence of the corresponding error 1202 within a predetermined time period ("1 day" in FIG. 12) at which the firmware is to be replaced.

The frequency of occurrence 1203 can be set differently with respect to each type of error. Alternatively, the frequency of occurrence 1203 can be set in the same manner as the manner of setting the corresponding error 1202.

The monitoring center host 111 determines the type of firmware that has caused the error based on the firmware error correspondence table if an error on the image forming apparatus 131 has been detected.

In the example illustrated in FIG. 12, the monitoring center host 111 determines that the firmware "R-CON" is the cause of the error if a reader communication error 1204 has frequently occurred more than ten times on the image forming apparatus 131 per day.

More specifically, every time the error information is notified from the image forming apparatus 131, the CPU 201 of the monitoring center host 111 stores the received error information on the HDD 205 and updates the firmware error correspondence table.

Then, by comparing the error information with the frequency of occurrence 1203, the CPU 201 of the monitoring center host 111 determines whether to replace the firmware with its latest version.

In processing 1008 illustrated in FIG. 10, the monitoring center host 111 refer to an error 1007 and identifies the firmware to be upgraded. As a result, in the example illustrated in FIG. 10, the monitoring center host 111 determines that an error has occurred on the R-CON. That is, in the example illustrated in FIG. 10, the R-CON is identified as the firmware that has caused the error.

In processing 1009 illustrated in FIG. 10, the monitoring center host 111 issues an instruction for replacing the R-CON to the image forming apparatus 131.

More specifically, if an error has been detected in the image forming apparatus 131, the monitoring center host 111 identifies the firmware that has caused the error and then issues an instruction for replacing the firmware that has caused the error (i.e., issues an instruction for replacing the version of the firmware) to the image forming apparatus 131.

In the example illustrated in FIG. 11, because the error on the R-CON has been detected after upgrading the firmware version from "Version 1.2" to "Version 2.2", the monitoring center host 111 issues an instruction for replacing the version of the R-CON from the latest version "10.00" (1107 in FIG. 11) to an immediate previous version "9.00" (1109 in FIG. 11).

In this case, the monitoring center host 111 determines the entire version whose version of R-CON corresponds to the version "9.00" (in the example illustrated in FIG. 11, "Version 2.1") and then notifies the entire version to the image forming apparatus 131 as the version to be transmitted.

In the example illustrated in FIG. 10, the monitoring center host 111 issues an instruction for downgrading the version (replacing the version to the previous version) of the type of the firmware identified to have caused the error (in the example illustrated in FIG. 10, the R-CON) to the immediately previous version (in the present exemplary embodiment, "Version 2.1"). However, the present exemplary embodiment is not limited to this.

That is, it is also useful if the user issues an instruction for downgrading the entire version to either of the versions "Version 2.0" through "Version 1.3". Alternatively, it is useful if the user issues an instruction for downgrading the entire version to "Version 1.2".

Alternatively, the user may issue an instruction for upgrading the version of the type of the firmware that has caused the error.

More specifically, for example, in the case where an error on the R-CON has been detected in the firmware whose entire version is "Version 1.2", the user may issue an instruction for upgrading the R-CON from the version "7.00" to its latest version "10.00".

In this case, the monitoring center host 111 determines the entire version whose version of R-CON corresponds to the version "10.00" (in the example illustrated in FIG. 11, "Version 2.2") and then notifies the entire version to the image forming apparatus 131 as the version to be upgraded.

Further alternatively, in this case, it is useful if the monitoring center host 111 issues an instruction for upgrading the entire version of the firmware to "Version 1.3", which is the later entire version, "Version 2.0", or "Version 2.1".

In processing 1010 illustrated in FIG. 10, the image forming apparatus 131 issues a request for downloading a replacement R-CON to the transmission server 133.

The transmission server 133 causes the image forming apparatus 131 to download the R-CON and other firmware that is to be changed (replaced). At this time, the transmission server 133 downloads (transmits) the replacement R-CON and the firmware of a different other type corresponding to the replacing R-CON at the same time.

More specifically, in the example illustrated in FIG. 11, the entire version "Version 2.1" has been instructed when the replacement of the R-CON has been instructed by the monitoring center host 111.

Here, the versions of the firmware MN-CONT and the BOOTROM are different between "Version 2.2" and "Version 2.1" (versions 1108 and 1110 in FIG. 11). Accordingly, the monitoring center host 111 determines that the firmware "Version 2.2" and "Version 2.1" is to be replaced.

Here, the order of applying the firmware is previously set. Accordingly, the transmission server 133 refers to the firmware application order table 1111 to acquire the application order. Then, the transmission server 133 stores the acquired application order in the information file 1113 and transmits the firmware information file 1113 including the application order to the image forming apparatus 131 together with the above-described firmware.

In the case where the image forming apparatus 131 replaces the R-CON with "Version 2.2" and "Version 2.1", the image forming apparatus 131, at first, disables all the types of the firmware that have already been installed.

Then, the image forming apparatus 131 installs the above-described versions according to the application order included in the information file 1113. However, the versions that have already been installed (the types of firmware (3), (5), (6), and (7) in FIG. 11) are only enabled.

More specifically, at first, the image forming apparatus 131 receives the types of firmware BOOTROM (1), MN-CONT (2), and R-CON (4) and the firmware information file 1113 from the transmission server 133 (processing 1011 illustrated in FIG. 10).

Then, the image forming apparatus 131 stores the received BOOTROM (1), MN-CONT (2), R-CON (4), and firmware information file 1113 in the temporary storage area of the HDD 509 of the image forming apparatus 131.

Then, the image forming apparatus 131 displaces all the types of the firmware that have already been installed to the temporary storage area of the HDD 509 to disable the same. In this case, the image forming apparatus 131 deletes the BOOTROM, MN-CONT, and R-CON, which are the replacement target firmware.

In processing 1012 illustrated in FIG. 10, the image forming apparatus 131 refers to the firmware information file 1113 and installs the firmware stored in the temporary storage area according to the application order acquired from the firmware information file 1113.

More specifically, the image forming apparatus 131 displaces the BOOTROM (1) from the temporary storage area to an appropriate area of the hard disk. In the same manner, the image forming apparatus 131 displaces the firmware to an appropriate location in order of the MN-CONT (2), D-CON (3), R-CON (4), PUNCH (5), SDL-STCH (6), and MEAP (7).

In the above-described manner, the image forming apparatus 131 completes the firmware replacement processing. In this regard, however, it is not always necessary to consider the firmware application order according to the type of the image forming apparatus 131.

In processing 1013 illustrated in FIG. 10, the image forming apparatus 131 transmits a firmware replacement completion notification to the monitoring center host 111.

In processing 1014 illustrated in FIG. 10, the monitoring center host 111 issues an instruction for raising the log level of the replaced firmware (an instruction for changing the log level) to the image forming apparatus 131. By performing the above-described processing, the present exemplary embodiment can increase the monitoring accuracy.

More specifically, in the example illustrated in FIG. 10, the monitoring center host 111 issues an instruction for changing the log level of the R-CON to "High". By performing this processing, the monitoring accuracy for monitoring the R-CON can be improved.

Note that the log level indicates the detailed level of various information notified from the image forming apparatus 131 to the monitoring center host 111, such as the error information, the frequency of communication, or the capacity of the information (data size) for the operation log.

The log level will be described in detail below with reference to FIG. 13.

FIG. 13 illustrates an example of a log level management table that the image forming apparatus 131 stores on the HDD 509. Note here that the image forming apparatus 131 transmits the information to the monitoring center host 111 according to the log level management table.

Referring to FIG. 13, a product identification (ID) 1301 indicates a model number uniquely set for the image forming apparatus 131. A product name 1302 indicates the product name of the image forming apparatus 131. A firmware type 1303 indicates the type of the firmware.

A log level 1304 indicates the log level of the firmware identified with the parameters 1301 through 1303. In the present exemplary embodiment, the log level of the firmware includes two levels, namely, "Low" and "High".

"Low" is the log level for notifying the error information with the minimum content. On the other hand, "High" is the log level for notifying the detailed error information and the history of operation of the image forming apparatus 131. In this regard, in the case where the log level "High" is set and notified, the frequency of notification of the information becomes high.

In processing 1015 illustrated in FIG. 10, after receiving an instruction for changing the log level of the replaced firmware to "High", the image forming apparatus 131 changes and sets the log level associated with the replaced firmware to "High".

In the example illustrated in FIG. 10, an error occurring on the R-CON is the trigger. Accordingly, the image forming apparatus 131 changes the log level of the R-CON from "Low" to "High".

The present exemplary embodiment having the above-described configuration raises the frequency of communication and the detailed level of the operation information notified from the image forming apparatus 131 in association with the replaced firmware. In the above-described manner, the present exemplary embodiment can increase the monitoring accuracy.

FIG. 14 illustrates an example of the above-described firmware version list table according to the present exemplary embodiment. Note that the firmware version list table is stored on both the HDD 205 of the monitoring center host 111 and that of the transmission server 133.

Referring to FIG. 14, a column 1401 includes a parameter indicating a version of the entire firmware. A column 1402 includes a parameter indicating the product name of the image forming apparatus 131. Columns 1403, 1404, 1405, 1406, 1407, 1408, and 1409 each include a parameter indicating each firmware type.

As described above, the firmware version list table stores information indicating a predetermined combination of the applicable versions of all types of the firmware.

FIG. 15 illustrates an example of the firmware application order table stored in the transmission server 133 (or the database 134) according to the present exemplary embodiment.

The firmware application order table stores data including the application order determined and set according to the product name and the firmware type (the application order information). Note that the firmware application order table is stored on the HDD 205 of the transmission server 133.

Referring to FIG. 15, a column 1501 indicates a version of the entire firmware. A column 1502 indicates the product name of the image forming apparatus 131.

A column 1503 indicates the each firmware type. A column 1504 indicates the order of applying the firmware to the image forming apparatus 131.

FIG. 16 illustrates an example of the above-described firmware information file according to the present exemplary embodiment.

This file includes a firmware entire version 1601, a product name 1602, a firmware type 1603, an application order (application order information) 1604, and combination information 1605 as its data content.

Note that a comma separated value (CSV) format can be used as the file format of the firmware information file. In this regard, it is also useful if a text format or other formats are used as the format of the firmware information file.

Figure 17:
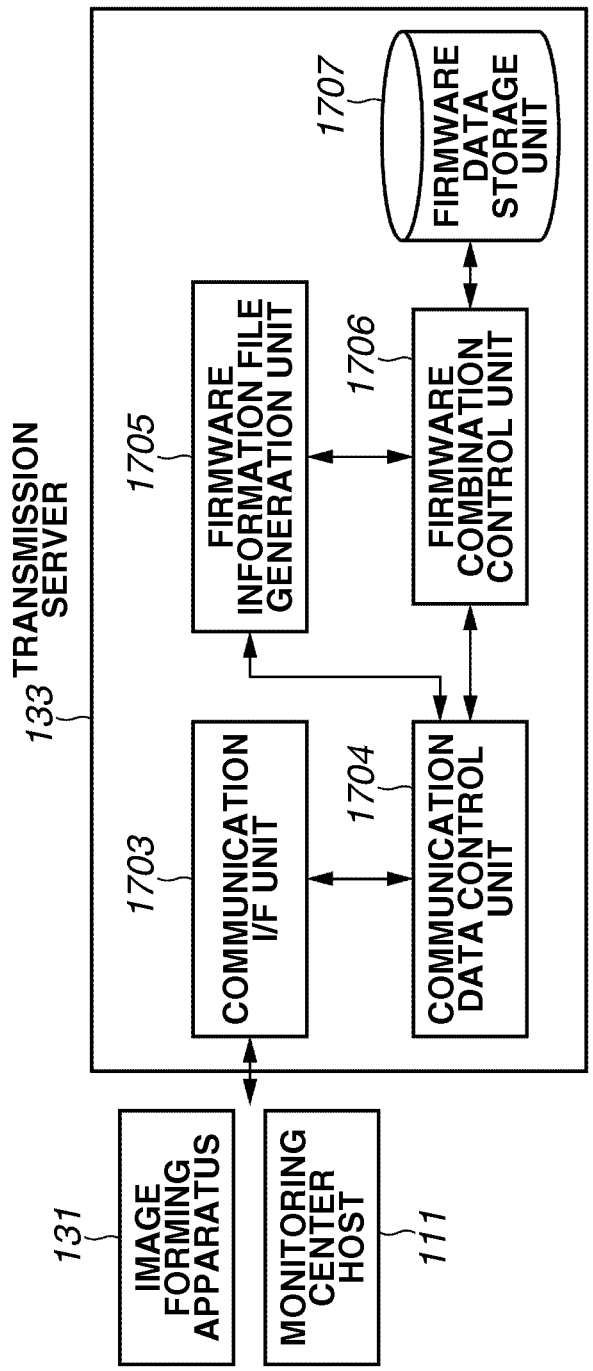
FIG. 17 illustrates an example of a functional configuration of the transmission server according to an exemplary embodiment of the present invention.

FIG. 17 illustrates an example of a functional configuration of the transmission server 133.

The image forming apparatus 131 and the monitoring center host 111 communicate with a communication I/F unit 1703 of the transmission server 133 by a SOAP communication.

A communication data control unit 1704 controls data received from the communication I/F unit 1703 and data to be transmitted from the transmission server 133 to the image forming apparatus 131.

A firmware information file generation unit 1705 generates a firmware information file illustrated in FIG. 16.

A firmware combination control unit 1706 performs a control for generating an appropriate firmware combination. A firmware data storage unit 1707 stores all versions of the firmware of a plurality of image forming apparatuses.

Note that the communication I/F unit 1703, the communication data control unit 1704, the firmware information file generation unit 1705, and the firmware combination control unit 1706 each implement a function implemented by loading and executing the program from the HDD 205 on the RAM 204 with the CPU 201 of the transmission server 133.

Furthermore, the firmware data storage unit 1707 implements the HDD 205 of the transmission server 133.

FIG. 18 is a flow chart that illustrates exemplary processing performed by the transmission server 133 during the firmware upgrading processing according to the present exemplary embodiment. The processing in the flow chart of FIG. 18 is implemented by loading and executing the program from the HDD 205 on the RAM 204 with the CPU 201 of the transmission server 133.

Referring to FIG. 18, in step S1801, after receiving a request for transmitting the firmware from the image forming apparatus 131 (the processings 1002 and 1010 in FIG. 10), the CPU 201 (the communication I/F unit 1703) of the transmission server 133 advances to step S1802.

In step S1802, the CPU 201 of the transmission server 133 determines which of the request for normally upgrading all types of firmware and the request for performing the error-responded upgrading processing for upgrading only specific firmware corresponding to the error the received firmware upgrading request is. That is, the CPU 201 of the transmission server 133 executes the function of the communication data control unit 1704.

Data D1803 indicates data that is transmitted to the transmission server 133 from the image forming apparatus 131 by the firmware normal upgrading processing.

The data D1803 includes the product name, the firmware version, the firmware to be downloaded (all the firmware types), and the version to be downloaded, with respect to each type of firmware.

Furthermore, data D1807 includes data that is transmitted to the transmission server 133 from the image forming apparatus 131 by the error-responded version upgrading processing. More specifically, the data D1807 includes the product name, the firmware version, the firmware to be downloaded (the specific firmware on which the error has occurred), and the version to be downloaded, with respect to each type of firmware.

More specifically, if it is determined in step S1802 that the data received in step S1801 is data illustrated in FIG. 18 as the data D1803 (YES in step S1802), then the CPU 201 of the transmission server 133 determines that the firmware upgrading request is the request for normally upgrading all the types of firmware. Then, the processing advances to step S1804.

On the other hand, if it is determined in step S1802 that the data received in step S1801 is data illustrated in FIG. 18 as the data D1807 (NO in step S1802), then the CPU 201 of the transmission server 133 determines that the request received in step S1801 is the request for performing the error-responded version upgrading processing for upgrading only specific firmware corresponding to the error. Then, the processing advances to step S1808.

The processing for transmitting all the types of firmware will be described in detail below.

In step S1804, the CPU 201 of the transmission server 133 refers to the firmware version list table 1101 and the firmware application order table 1111 to search for the data of the firmware of the version to be downloaded according to the information included in the data D1803 (the processing 1004 illustrated in FIG. 10). More specifically, the CPU 201 of the transmission server 133 executes the function of the firmware combination control unit 1706.

Furthermore, according to the result of the search, the CPU 201 of the transmission server 133 generates the firmware information file 1113. More specifically, the CPU 201 of the transmission server 133 executes the function of the firmware information file generation unit 1705.

In step S1805, the CPU 201 of the transmission server 133 downloads (transmits) the firmware extracted as a result of the search in step S1804 and the firmware information file 1113 (data D1806) generated in step S1804 on the image forming apparatus 131. More specifically, the CPU 201 of the transmission server 133 executes the function of the communication data control unit 1704.

Note that in step S1805, in the case of performing the normal firmware transmission processing, information about all types of the firmware, among information included in the notification from the CPU 201 of the transmission server 133 to the image forming apparatus, is notified.

Now, processing for transmitting specific firmware corresponding to the error will be described in detail below.

In step S1808, the CPU 201 of the transmission server 133 refers to the firmware version list table 1101 to determine the other type of firmware whose version is to be changed related to replacing the version of the specific firmware on which the error has occurred to the download target version. More specifically, the CPU 201 of the transmission server 133 executes the function of the firmware combination control unit 1706.

In the example illustrated in FIG. 11, an error has occurred on the R-CON "10.00" (the version 1107 in FIG. 11). Accordingly, the R-CON "10.00" (the version 1107 in FIG. 11) is replaced with the R-CON "9.00" (the version 1109 in FIG. 11).

In this case, it is necessary to replace the firmware whose versions of the firmware are different between "Version 2.2" and "Version 2.1". Therefore, in this case, the MN-CON "19.00" (the version 1108 in FIG. 11) and the BOOTROM "11.00" (the version 1110 in FIG. 11) are also to be downloaded.

In step S1808 of FIG. 18, the CPU 201 of the transmission server 133 determines whether firmware to be upgraded related to the specific firmware to be replaced, such as the MN-CON "19.00" (the version 1108 in FIG. 11) and the BOOTROM "11.00" (the version 1110 in FIG. 11), exists.

If it is determined by the CPU 201 of the transmission server 133 in step S1808 that a different other type of firmware whose version is to be changed related to the specific firmware on which the error has occurred (YES in step S1808), then the processing advances to step S1809.

In step S1809, the CPU 201 of the transmission server 133 refers to the firmware version list table 1101 and the firmware application order table 1111 to search for the specific firmware and the data of the firmware related thereto according to the information included in the data D1807. More specifically, the CPU 201 of the transmission server 133 executes the function of the firmware combination control unit 1706.

Furthermore, the CPU 201 of the transmission server 133 generates the firmware information file according to the result of the search. More specifically, the CPU 201 of the transmission server 133 executes the function of the firmware information file generation unit 1705.

In step S1805, the CPU 201 of the transmission server 133 downloads (transmits) the firmware extracted as a result of the search in step S1809 and the firmware information file 1113 (the data D1806) generated in step S1809 on the image forming apparatus 131 (the processing 1011 illustrated in FIG. 10). More specifically, the CPU 201 of the transmission server 133 executes the function of the communication data control unit 1704.

Note that in the case of performing the error-responded firmware transmitting processing and if it is determined in step S1808 that related firmware exists (YES in step S1808), the specific firmware on which the error has occurred and the related firmware extracted as a result of the search in step S1809 are transmitted from the transmission server 133 to the image forming apparatus 131 in step S1805.

On the other hand, if it is determined in step S1808 that no firmware related to the specific firmware on which the error has occurred exists (NO in step S1808), then the processing advances to step S1810.

In step S1810, the CPU 201 of the transmission server 133 refers to and search the firmware version list table 1101 and the firmware application order table 1111 for data of the specific firmware according to the information included in the data D1807. More specifically, the CPU 201 of the transmission server 133 executes the function of the firmware combination control unit 1706.

Furthermore, according to the result of the search, the CPU 201 of the transmission server 133 generates the firmware information file. More specifically, the CPU 201 of the transmission server 133 executes the function of the firmware information file generation unit 1705.

Note that in the case of performing the error-responded firmware transmission processing and if it is determined in step S1808 that no related firmware exists (NO in step S1808), the specific firmware on which the error has occurred is transmitted from the transmission server 133 to the image forming apparatus 131 in step S1805.

FIG. 19 is a flow chart that illustrates exemplary processing performed by the monitoring center host 111 during the firmware upgrading processing according to the present exemplary embodiment. Note that the processing in the flow chart is implemented by loading and executing the program from the HDD 205 on the RAM 204 with the CPU 201 of the monitoring center host 111.

Referring to FIG. 19, in step S1901, the CPU 201 of the monitoring center host 111 determines whether the user has issued an instruction for upgrading the firmware.

Here, the instruction for upgrading the firmware is the firmware upgrading instruction issued by a service person in charge of administering the image forming apparatus 131 via a web screen of the monitoring center host 111 illustrated in FIGS. 21 and 22, which will be described in detail later below.

If it is determined in step S1901 that the instruction for upgrading the firmware has been issued (YES in step S1901), then the CPU 201 of the monitoring center host 111 advances to step S1902.

In step S1902, if it is determined in step S1901 that the instruction for upgrading the firmware has been issued (YES in step S1901) as described above, the CPU 201 of the monitoring center host 111 determines that the received instruction indicates normally upgrading the firmware. Then, the processing advances to step S1903.

In step S1903, the CPU 201 of the monitoring center host 111, in order to upgrade the firmware, issues an instruction for upgrading all types of firmware to the image forming apparatus 131 (the processing 1001 in FIG. 10).

In this case, the CPU 201 of the monitoring center host 111 also issues an instruction indicating the version to be downloaded (the entire version) to the image forming apparatus 131.

By performing the above-described processing, the processing for applying the firmware by the image forming apparatus 131 is completed. In step S1904, the CPU 201 of the monitoring center host 111 receives a firmware upgrading completion notification from the image forming apparatus 131 (the processing 1006 in FIG. 10). Then, the processing in the flow chart of FIG. 19 ends.

On the other hand, if it is determined in step S1901 that no instruction for upgrading the firmware is issued (NO in step S1901), then the CPU 201 of the monitoring center host 111 advances to step (state) S1905.

In step S1905, it is supposed that an error has occurred on the firmware after information indicating an error on the image forming apparatus 131 has been received (the processing 1007 in FIG. 10).

In the example illustrated in FIG. 19, data D1906 is transmitted from the image forming apparatus 131 to the monitoring center host 111 in this case. More specifically, the product ID and the error information are transmitted from the image forming apparatus 131 to the monitoring center host 111 as the data D1906.

In step S1907, the CPU 201 of the monitoring center host 111 refers to the firmware error correspondence table illustrated in FIG. 12 to identify the type of firmware that has caused the error according to the data D1906 (the processing 1008 in FIG. 10). Then, the processing advances to step S1902.

Note that although not illustrated in FIG. 19, if it is determined by the CPU 201 of the monitoring center host 111 that the frequency of occurrence of the corresponding error is equal to or less than the frequency of occurrence (threshold value) 1203, which is held in the firmware error correspondence table (FIG. 12), then the information about the frequency of occurrence of the corresponding error, which is stored on the HDD 205, is updated. Then, the processing in the flow chart of FIG. 19 ends.

In step S1902, if it is determined in step S1901 that no instruction for upgrading the firmware is issued (NO in step S1901), the CPU 201 of the monitoring center host 111 determines that the request issued in step S1901 is not the request for performing the firmware normal upgrading processing. Then, the processing advances to step S1908.

In step S1908, the CPU 201 of the monitoring center host 111 issues an instruction for replacing the (error-causing) firmware on which the error has occurred and identified in step S1907 (the specific type firmware) (i.e., issues a firmware replacing instruction), as indicated as the processing 1009 in FIG. 10.

In this case, the CPU 201 of the monitoring center host 111 also instructs (notifies) the image forming apparatus 131 of the version to be downloaded (the entire version).

As described above, in the present exemplary embodiment, in step S1908, the CPU 201 of the monitoring center host 111 automatically issues an instruction for replacing the firmware on which the error has occurred.

However, the present exemplary embodiment is not limited to this. That is, it is also useful if the CPU 201 of the monitoring center host 111 notifies the information about the firmware that has caused the error to a previously registered e-mail address of the service person.

In the case of employing this configuration, the service person refers to the e-mail and manually designates the firmware on which the error has occurred via a screen illustrated in FIG. 22 and then manually instructs the transmission of the designated firmware.

By performing the above-described processing, the processing for applying the firmware performed by the image forming apparatus 131 is completed. In step S1909, the CPU 201 of the monitoring center host 111 receives a firmware replacement completion notification from the image forming apparatus 131 (the processing 1013 in FIG. 10). Then, the processing advances to step S1910.

In step S1910, the CPU 201 of the monitoring center host 111 issues an instruction, to the image forming apparatus 131, for raising the log level of the log corresponding to the specific type firmware to which the instruction for replacing the same has been issued due to the error occurring thereon (the processing 1014 in FIG. 10). Then, the processing in the flow chart ends.

FIG. 20 is a flow chart that illustrates exemplary processing performed by the image forming apparatus 131 during the firmware upgrading processing according to the present exemplary embodiment. Note that the processing in the flow chart of FIG. 20 is implemented by loading and executing the program from the HDD 509 on the RAM 508 with the CPU 506 of the image forming apparatus 131.

Referring to FIG. 20, in step S2001, the CPU 506 of the image forming apparatus 131 receives a firmware upgrading instruction from the monitoring center host 111 (the processings 1001 and 1009 in FIG. 10). Then, the processing advances to step S2002.

In step S2002, the CPU 506 of the image forming apparatus 131 determines which of the instruction for performing the normal firmware upgrading and the instruction for performing the error-responded firmware upgrading processing has been received in step S2001.

Furthermore, if it is determined in step S2002 that the firmware upgrading instruction received in step S2001 is the instruction for performing the normal firmware upgrading (similar to the instruction issued in step S1903 of FIG. 19), then the CPU 506 of the image forming apparatus 131 advances to step S2003.

In step S2003, the CPU 506 of the image forming apparatus 131 issues a request for transmitting all types of firmware to the transmission server 133 (the processing 1002 illustrated in FIG. 10).

In this case, the CPU 506 of the image forming apparatus 131 transmits the data indicated as the data D1803 in FIG. 18 to the transmission server 133. Then, the processing advances to step S2005.

On the other hand, if it is determined in step S2002 that the instruction issued in step S2001 is not the instruction for normally upgrading the firmware (i.e., the instruction for performing the error-responded firmware replacement processing) (the instruction issued in step S1908 in FIG. 19), then the CPU 506 of the image forming apparatus 131 advances to step S2004.

In step S2004, the CPU 506 of the image forming apparatus 131 issues a request, to the transmission server 133, for transmitting the specific firmware corresponding to the error (a changing firmware version transmission request), as illustrated as the processing 1010 in FIG. 10. In this case, the CPU 506 of the image forming apparatus 131 transmits the data D1807 in FIG. 18 to the transmission server 133. Then, the processing advances to step S2005.

In step S2005, the CPU 506 of the image forming apparatus 131 downloads the firmware from the transmission server 133 and applies the downloaded firmware.

Note that in the case of normally upgrading the firmware, all types of the firmware and the firmware information file 1113 are downloaded from the transmission server 133 (firmware receiving processing).

Then, the CPU 506 of the image forming apparatus 131 applies the firmware according to the application order included in the firmware information file 1113 (the processing 1005 illustrated in FIG. 10).

On the other hand, in the case of transmitting the specific firmware corresponding to the error, the CPU 506 of the image forming apparatus 131 downloads the specific firmware on which the error has occurred, the different other type of firmware whose version is to be changed related to the specific firmware, and the firmware information file 1113 from the transmission server 133 (firmware receiving processing).

Then, the CPU 506 of the image forming apparatus 131 applies the firmware according to the application order included in the firmware information file 1113 (the processing 1012 illustrated in FIG. 10).

Then, after the application of the firmware has been completed, in step S2006, the CPU 506 of the image forming apparatus 131 transmits a firmware replacement completion notification to the monitoring center host 111 (the processings 1006 and 1013 illustrated in FIG. 10).

In step S2007, the CPU 506 of the image forming apparatus 131 determines whether it is necessary to change the log level of the upgraded firmware.

In this regard, the CPU 506 of the image forming apparatus 131 determines that it is necessary to change the log level of the upgraded firmware if an instruction for changing the log level of the upgraded firmware has been received from the monitoring center host 111. Then, the processing advances to step S2008.

In step S2008, the CPU 506 of the image forming apparatus 131 changes the log level 1304 held in the log level management table (FIG. 13) stored on the HDD 509 to "High" so that the log level currently set for the upgraded firmware is changed (the processing 1015 in FIG. 10). Then, the processing in the flow chart of FIG. 20 ends.

On the other hand, if it is determined in step S2007 that no instruction for changing the log level of the upgraded firmware has been received from the monitoring center host 111 (NO in step S2007), then the CPU 506 of the image forming apparatus 131 determines that it is not necessary to change the log level of the upgraded firmware. Then, the processing in the flow chart of FIG. 20 ends.

With the above-described configuration, the image forming apparatus monitoring system according to the present exemplary embodiment can quickly detect any error occurring on the image forming apparatus after the firmware thereof has been upgraded and identify which firmware has caused the error. Accordingly, the present exemplary embodiment can reduce the time taken for restoration of the image forming apparatus to a minimum.

In addition, the present exemplary embodiment considers the combination of the firmware and the order of applying the firmware in upgrading the firmware.

Accordingly, the present exemplary embodiment can replace the version of the firmware so that the appropriate combination of the firmware versions can be achieved with respect to the entire version even in the case of changing only the specific firmware. Therefore, the present exemplary embodiment can always appropriately upgrade the firmware.

Furthermore, in upgrading the firmware, the present exemplary embodiment considers the application order with respect to the image forming apparatus that may not always properly operate according to the order of applying the firmware. Accordingly, the present exemplary embodiment can always appropriately upgrade the firmware.

Furthermore, the present exemplary embodiment, as described above, raises the log level of the firmware on which the error has occurred and whose version has been replaced due to the error. Thus, the present exemplary embodiment can increase the monitoring accuracy.

Now, a case is described where the service person in charge of administering the image forming apparatus 131 issues an instruction for upgrading the firmware via a web screen of the monitoring center host 111 according to the present exemplary embodiment.

FIG. 21 illustrates an example of a search screen of the monitoring center host 111 used for issuing an instruction for upgrading and transmitting the firmware according to the present exemplary embodiment.

FIG. 22 illustrates a detailed content display screen of the monitoring center host 111 used for issuing an instruction for upgrading and transmitting the firmware according to the present exemplary embodiment.

Note that the screens are displayed on the monitoring center host 111 (or a web server (not illustrated)). The service person in charge of administering the image forming apparatus can issue an instruction for upgrading the firmware of the image forming apparatus via the screens.

Referring to FIG. 21, a menu 2101 is a menu for searching for the image forming apparatus that is the firmware upgrading target.

The service person searches for the firmware upgrading target image forming apparatus by selecting an item from the menu 2101. A result 2102 indicates a result of the search of the item designated from the search menu 2101.

When the service person presses a DETAIL button, the screen shifts from the screen illustrated in FIG. 21 to the screen illustrated in FIG. 22.

In the screen illustrated in FIG. 22, the current firmware version of the image forming apparatus is displayed in a field 2201. Furthermore, a firmware upgrading method is indicated in the field 2201.

Here, in the case of performing the firmware normal upgrading processing, the service person selects "normal version upgrading", while in the case of performing the error-responded firmware upgrading processing, the service person selects "individual version upgrading". When the service person selects "entire firmware version", the entire version of the firmware can be changed.

By checking a check box in a field 2202, the service person can designate which firmware is to be installed. In this regard, when "normal version upgrading" has been selected via the field 2201, all the check boxes are automatically checked. In this case, each individual check box cannot be checked.

The service person can also set the data and time for transmitting the firmware via a field 2203. When the date and time for transmitting (upgrading) the firmware is set via the field 2203, the instruction for upgrading the firmware (the instruction received and determined in step S1901 in FIG. 19) is issued to the monitoring center host 111 at the thus set time.

In the present exemplary embodiment, in issuing the instruction for upgrading the specific firmware that is the cause of the error from the transmission server 133 to the image forming apparatus, the type of the firmware to be downloaded and the entire version ("Version 2.1", for example) of the firmware to be downloaded are designated.

However, the present exemplary embodiment is not limited to this. That is, it is also useful if each individual version ("9.00", for example) of the type of the firmware to be downloaded and the firmware to be downloaded are designated.

In the case of employing the above-described configuration, an individual version ("Version 9.00", for example) of the firmware to be downloaded is designated in the case where the image forming apparatus issues a request for transmitting the firmware to the transmission server 133.

In addition, the transmission server 133 refers to the individual version of the firmware and the firmware version list table 1101 to determine the entire version.

Furthermore, the transmission server 133, according to the determined entire version, determines the firmware of a different type whose version is to be changed related to the change of the version of the firmware to be downloaded.

Furthermore, in the present exemplary embodiment having the above-described configuration, the apparatuses communicate with one another by using HTTP/SOAP protocol as illustrated in FIGS. 6 through 8. However, this configuration is a mere example and the present invention is not limited thereto. That is, any type of protocol can be used in the communication among the apparatuses.

Furthermore, in the present exemplary embodiment, the monitoring center host 111 issues an instruction for transmitting the firmware to the image forming apparatus 131. In addition, the image forming apparatus issues a request for downloading the firmware to the transmission server 133 according to the firmware transmission instruction. Then, the monitoring center host 111 downloads the firmware on the image forming apparatus 131 according to the firmware downloading request.

However, it is also useful if the monitoring center host 111 issues an instruction to the transmission server 133 for downloading the firmware on the image forming apparatus 131 and the transmission server 133 downloads the firmware on the image forming apparatus 131 according to the instruction.

Furthermore, the structure and the content of the above-described various types of data are not limited to those described above. That is, various different structures and contents can be employed and included as necessary according to the purpose of use of the data.

The exemplary embodiment of the present invention is as described above. The present invention can be implemented in a system, an apparatus, a method, a program, or a storage medium storing the program, for example. More specifically, the present invention can be applied to a system including a plurality of devices and to an apparatus that includes only one device.

Hereinbelow, the configuration of a memory map of a storage medium storing various types of data processing program that can be read by the transmission server 133, the monitoring center host 111, and the image forming apparatus of the image forming apparatus monitoring system according to an exemplary embodiment of the present invention is described with reference to a memory map illustrated in FIG. 9.

Although not illustrated in FIG. 9, information for managing the programs stored in the storage medium such as version information and information concerning the creator of a program, for example, can be stored in the storage medium. In addition, information that depends on an operating system (OS) of an apparatus that reads the program, such as an icon for identifying and displaying the program, can be stored in the storage medium.

In addition, data that is subordinate to the various programs is also managed in a directory of the storage medium. In addition, a program for installing the various programs on a computer can be stored in the storage medium. In addition, in the case where a program to be installed is compressed, a program for decompressing the compressed program can be stored in the storage medium.

In addition, the functions according to the above-described exemplary embodiments illustrated in FIGS. 18, 19, and 20 can be implemented by a host computer using a program that is externally installed. In this case, the present invention is applied to the case where a group of information including a program is supplied to an output device from a storage medium such as a CD-ROM, a flash memory, and a floppy disk (FD) or from an external storage medium via a network.

The present invention can also be achieved by providing a system or an apparatus with a storage medium storing program code of software implementing the functions of the embodiments and by reading and executing the program code stored in the storage medium with a computer of the system or the apparatus (a CPU or a micro processing unit (MPU)).

In this case, the program code itself, which is read from the storage medium, implements the functions of the embodiments described above, and accordingly, the storage medium storing the program code constitutes the present invention.

Accordingly, the program can be configured in any form, such as object code, a program executed by an interpreter, and script data supplied to an OS.

As the storage medium for supplying such program code, a floppy disk, a hard disk, an optical disk, a magneto-optical disk, a magneto-optical disk (MO), a compact disc read only memory (CD-ROM), a compact disc recordable (CD-R), a compact disc rewritable (CD-RW), a magnetic tape, a non-volatile memory card, a read-only memory (ROM), and a digital versatile disc (DVD (DVD-recordable (DVD-R), DVD-rewritable (DVD-RW))), for example, can be used.

In this case, the program code itself, which is read from the storage medium, implements the function of the embodiments mentioned above, and accordingly, the storage medium storing the program code constitutes the present invention.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk. The functions of the above embodiments can also be implemented by dividing the program code into a plurality of files and downloading each divided file from different web sites. That is, a World Wide Web (WWW) server and a file transfer protocol (ftp) server for allowing a plurality of users to download the program file for implementing the functional processing configure the present invention.

In addition, the above program can also be supplied by distributing a storage medium such as a CD-ROM and the like which stores the program according to the present invention after an encryption thereof, by allowing the user who is qualified for a prescribed condition to download key information for decoding the encryption from the web site via the Internet, and by executing and installing on the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

In addition, the present invention can be applied to a system including a plurality of devices and to an apparatus that includes one device. Furthermore, the present invention can be implemented by supplying a system or an apparatus with a program. In this case, by reading the storage medium that stores a program described by software that can implement the present invention with the system or the apparatus, the system or the apparatus can implement the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-322084 filed Dec. 13, 2007, which is hereby incorporated by reference herein in its entirety.

What is claimed is:

1. An image forming apparatus monitoring system comprising:
    an image forming apparatus configured to be controlled by a plurality of types of firmware;
    a monitoring server configured to monitor the image forming apparatus; and
    a transmission server configured to transmit firmware to the image forming apparatus,
    wherein the monitoring server comprises:
        a detection unit configured to detect an error occurring on the image forming apparatus based on operation information notified from the image forming apparatus;
        an identification unit configured to identify a type of firmware that has caused the error detected by the detection unit; and
        a firmware replacement instruction unit configured to issue a first instruction for replacing a version of the type of firmware identified by the identification unit to the image forming apparatus, wherein the image forming apparatus comprises:
a firmware transmission requesting unit configured to issue, to the transmission server, a request for transmitting a replacement version of the identified type of firmware, which has been instructed by the monitoring server to be replaced;
a firmware receiving unit configured to receive the replacement version of the identified type of firmware transmitted from the transmission server and another type of firmware, whose version is to be replaced in association with the replacement version of the identified type of firmware, according to the request for transmitting the replacement version of the identified type of firmware issued by the firmware transmission requesting unit;
an application unit configured to apply each firmware received by the firmware receiving unit to the image forming apparatus,
a sending unit configured to send an upgrade completion notification to the monitoring server; and
a setting unit configured to perform at least one of a setting for raising a frequency of notifying the operation information to be notified to the monitoring server in association with the specific type of firmware applied by the application unit and a setting for raising a detailed level of the operation information according to a second instruction from the monitoring server in response to the upgrade completion notification,
wherein, in the monitoring server, the second instruction is not transmitted to the image forming apparatus in a case where a normal firmware upgrade is performed, and the second instruction is transmitted to the image forming apparatus in a case where the first instruction caused by an error due to the firmware is transmitted, and
wherein the transmission server comprises:
a determination unit configured to, according to the request for transmitting the replacement version of the identified type of firmware issued from the image forming apparatus, determine the another type of firmware whose version is to be replaced in association with the replacement version of the identified type of firmware based on information about a combination of predetermined applicable firmware versions; and
a firmware transmission unit configured to transmit the replacement version of the identified type of firmware and the another type of firmware determined by the determination unit to the image forming apparatus.

2. The image forming apparatus monitoring system according to claim 1, wherein the normal firmware upgrade includes a firmware upgrade according to a transmission instruction by an operator via a screen provided by the monitor server.

3. An image forming apparatus configured to be controlled by a plurality of types of firmware, the image forming apparatus comprising:
a notification unit configured to notify operation information about the image forming apparatus to a monitoring server;
a firmware transmission requesting unit configured to, if an error on the image forming apparatus has been detected by the monitoring server according to the operation information notified by the notification unit and first instruction for replacing a version of a specific type of firmware that has caused the error has been received from the monitoring server, issue, to a transmission server, a request for transmitting a replacement version of the specific type of firmware;
a firmware receiving unit configured to receive the replacement version of the specific type of firmware transmitted from the transmission server and another type of firmware, whose version is to be replaced in association with the replacement version of the specific type of firmware, according to the request for transmitting the replacement version of the specific type of firmware issued by the firmware transmission requesting unit;
an application unit configured to apply each firmware received by the firmware receiving unit to the image forming apparatus;
a sending unit configured to send an upgrade completion notification to the monitoring server; and
a setting unit configured to perform at least one of a setting for raising a frequency of notifying the operation information to be notified to the monitoring server in association with the specific type of firmware applied by the application unit and a setting for raising a detailed level of the operation information according to a second instruction from the monitoring server in response to the upgrade completion notification;
wherein, in the monitoring server, the second instruction is not transmitted to the image forming apparatus in a case where a normal firmware upgrade is performed, and the second instruction is transmitted to the image forming apparatus in a case where the first instruction caused by an error due to the firmware is transmitted.

4. The image forming apparatus according to claim 3, wherein the firmware receiving unit is configured to further receive application order information indicating an order of application of the firmware, and wherein the application unit is configured to apply each firmware according to an order based on the application order information.

5. The image forming apparatus according to claim 3, wherein the normal firmware upgrade includes a firmware upgrade according to a transmission instruction by an operator via a screen provided by the monitor server.

6. A method for controlling an image forming apparatus, which is configured to be controlled by a plurality of types of firmware, the method comprising:
notifying operation information about the image forming apparatus to a monitoring server, wherein
if an error on the image forming apparatus has been detected by the monitoring server according to the notified operation information and a first instruction for replacing a version of a specific type of firmware that has caused the error has been received from the monitoring server, issuing, to a transmission server, a request for transmitting a replacement version of the specific type of firmware;
receiving the replacement version of the specific type of firmware transmitted from the transmission server and another type of firmware, whose version is to be replaced in association with the replacement version of the specific type of firmware, according to the received request for transmitting the replacement version of the specific type of firmware;
applying each received firmware to the image forming apparatus;
sending an upgrade completion notification to the monitoring server; and
raising a frequency of notifying the operation information to be notified to the monitoring server in association with the specific type of firmware applied by the application unit and raising a detailed level of the operation information according to a second instruction from the monitoring server in response to the upgrade completion notification, wherein, in the monitoring server, the second instruction is not transmitted to the image forming apparatus in a case where a normal firmware upgrade is performed, and the second instruction is transmitted to the image forming apparatus in a case where the first instruction caused by an error due to the firmware is transmitted.

7. The method according to claim 6, further comprising:

receiving application order information indicating an order of application of the firmware; and applying each firmware according to an order based on the application order information.

8. The method according to claim 6, wherein the normal firmware upgrade includes a firmware upgrade according to a transmission instruction by an operator via a screen provided by the monitor server.

\* \* \* \* \*